United States Patent
Oku et al.

(10) Patent No.: US 6,521,207 B2
(45) Date of Patent: Feb. 18, 2003

(54) MOLDING OF BINDERLESS ZEOLITE, METHOD FOR PRODUCTION THEREOF, AND USES THEREOF

(75) Inventors: Tomoharu Oku, Suita (JP); Hideaki Tsuneki, Tokyo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/975,472

(22) Filed: Oct. 11, 2001

(65) Prior Publication Data

US 2002/0041845 A1 Apr. 11, 2002

Related U.S. Application Data

(62) Division of application No. 09/587,488, filed on Jun. 5, 2000, now abandoned.

(30) Foreign Application Priority Data

| Jun. 18, 1999 | (JP) | 11-172760 |
| Jun. 22, 1999 | (JP) | 11-174852 |
| Oct. 14, 1999 | (JP) | 11-291887 |
| Nov. 11, 1999 | (JP) | 11-320728 |

(51) Int. Cl.[7] .................. C01B 39/36; C01B 39/40; C01B 39/04
(52) U.S. Cl. .................. 423/705; 423/713; 423/716; 423/DIG. 22; 423/DIG. 27; 423/DIG. 29; 502/60; 502/71; 502/77
(58) Field of Search .................. 423/705, 713, 423/716, DIG. 22, DIG. 27, DIG. 29; 502/61, 60, 71, 73, 77

(56) References Cited

U.S. PATENT DOCUMENTS

| 3,308,069 A | 3/1967 | Wadlinger et al. |
| 3,594,121 A | * 7/1971 | Weber |
| 3,702,886 A | 11/1972 | Argauer et al. |
| 3,709,979 A | 1/1973 | Chu |
| 3,804,746 A | 4/1974 | Chu |
| 4,058,586 A | * 11/1977 | Chi et al. |
| 4,789,656 A | 12/1988 | Chen et al. ................. 502/74 |
| 5,098,894 A | 3/1992 | Sakurada et al. ............ 502/66 |
| 5,460,796 A | 10/1995 | Verduijn .................... 423/716 |
| 5,558,851 A | 9/1996 | Miller ...................... 423/702 |
| 5,683,952 A | 11/1997 | Onozawa et al. ........... 432/716 |
| 5,919,430 A | 7/1999 | Hasenzahl et al. ......... 423/716 |
| 6,004,527 A | 12/1999 | Murrell et al. ............ 423/712 |
| 6,008,425 A | 12/1999 | Mohr et al. |
| 6,022,519 A | 2/2000 | Shimizu et al. ........... 423/700 |
| 6,111,157 A | 8/2000 | Mohr et al. |

FOREIGN PATENT DOCUMENTS

| EP | 0 152 485 | 8/1985 |
| EP | 0 226 195 | 6/1987 |
| EP | 299 430 A | 1/1989 |
| EP | 311 983 A | 4/1989 |
| JP | 61-72620 | 4/1986 |
| JP | 9-175818 | 7/1997 |
| JP | 11-165074 | 6/1999 |
| WO | WO 92/12928 | 8/1992 |

OTHER PUBLICATIONS

Altoff et al., "Is the formation of a zeolite from a dry powder via a gas phase transport process possible?", Microporous Materials, 2 (1994), pp. 557–562.*
Patent Abstracts of Japan vol. 1999. No. 11, Sep. 30, 1999 & JP 11 165074 A (Mitsubishi Gas Chem Co. Inc.) Jun. 22, 1999, abstract.
Meier et al., Atlas of Zeolite Structure Types, Third Edition, pp. 138–139, 193, 1992.

* cited by examiner

*Primary Examiner*—David Sample
(74) *Attorney, Agent, or Firm*—Fish & Richardson P.C.

(57) ABSTRACT

A method for producing a molding of binderless zeolite by exposing to saturated steam a precursor having a tetraalkylammonium salt component, an alkali metal component, and a metal component incorporated in the crystal skeleton of zeolite supported on a molding using silica as a main component, the molding of binderless zeolite, and use of the molding as a catalyst for the production of an alkanolamine.

11 Claims, 14 Drawing Sheets

MOLDING OF BINDERLESS ZEOLITE, METHOD FOR PRODUCTION THEREOF, AND USES THEREOF

CROSS REFERENCE TO RELATED APPLICATIONS

This application is a divisional (and claims the benefit of priority under 35 USC 120) of U.S. application Ser. No. 09/587,488, filed Jun. 5, 2000, now abandoned.

BACKGROUND OF THE INVENTION

1. Field of the Invention

This invention relates to a binderless zeolite molding, a method for the production thereof, and uses thereof.

2. Description of the Related Art

The ZSM-5 type zeolite designates crystalline metallosilicates represented by crystalline aluminosilicates which have the pores of 10 oxygen atom-membered ring as disclosed in U.S. Pat. No. 3,702,886. As regards the crystalline aluminosilicates which have silicon and aluminum as metallic components of the crystal skeleton of zeolite, the practice of preparing or using crystalline metallosilicates in which the $Al^{3+}$ cation being substituted with another metal ion for the purpose of controlling mainly the acidic quality thereof has been widely in vogue. Silicalite without aluminum having the same structure as the above or the crystalline metallosilicates in which the aluminum being substituted with another metal ions are generally called the ZSM-5 type zeolite (the MFI type according to the Framework Topology Code adopted by International Zeolite Association).

As a method of synthesizing the ZSM-5 type zeolite, the hydrothermal synthetic method has been known in which a water slurry using tetra-n-propylammonium ion as a template agent is adopted as the raw material for the zeolite.

In the conventional hydrothermal synthetic method, however, the raw material components are partly dissolved in water while they are being heated. The proportion of the components to be converted into crystals, therefore, is inevitably decreased and the time for the crystallization is elongated greatly because the alkaline component is diluted. By the method of such slow crystallization, crystals of large sizes are liable to grow and, moreover, different metal ions from silicon are liable to be expelled from the crystal lattice. The atomic ratio of Si/Al in the water slurry, therefore, does not always coincide with the atomic ratio of Si/Al of the produced ZSM-5 type zeolite. Further, this method performed on a commercial scale entails the following problems, because it requires the water slurry to be heated, that it necessitates a closed, large reaction vessel proportionately to the weight of the resultant crystal, requires an expensive, much template agent, emits an effluent in a large volume and the process for filtering and calcining zeolite powder is complicated.

In the production of a molding of conventional zeolite, the zeolite used solely manifests poor formability. This production, therefore, requires first to synthesize zeolite powder by the hydrothermal synthetic method and thereafter form the powder in shape by utilizing an inorganic binder. This method is required to choose a binder which is incapable of exerting any adverse effect on the intended use of the product. It further requires the inorganic binder in a large amount for enabling the product to acquire fully satisfactory strength. This production, therefore, is at a disadvantage in not only lowering the zeolite content in the produced molding but also disabling effective utilization of zeolite buried in the binder.

In the circumstances, methods for producing moldings of zeolite substantially without binders have been proposed. For example, several moldings of crystalline type binderless aluminosilicates are taught in JP-A-59-162,952 (TSZ type aluminosilicates), JP-A-61-72,620 (MOR type aluminosilicates), and JP-A-62-138,320 (FAU type aluminosilicates) have been known. In these methods, formed masses are produced by preparing, as the secondary raw material, a synthesized zeolite powder in advance and treating the zeolite powder with a clayey mineral or an inorganic binder such as silica-alumina. Since their binders in the formed masses are converted into zeolites by treating the masses with an alkali solution, they require hydrothermal synthesis substantially twice. They, therefore, entail such problems as elongating the process and enlarging the amount of effluent. Further, these methods require the atomic ratio of Si/Al in the aluminosilicate as the secondary raw material to coincide with the atomic ratio of Si/Al in the inorganic binder. Incidentally, since the formability of the aluminosilicate is degraded when the inorganic binder has a small aluminum content, the production of a molding of a binderless aluminosilicate having a large silica content or the production of a binderless zeolite with a crystalline metallosilicate substantially without aluminum has never been attained. The crystallization is attained by performing the process of hydrothermal synthesis twice. It has, therefore, entailed such problems as encountering difficulty in taking the aluminum into the zeolite lattice and inevitably forming impurities in the product from the aluminum outside the lattice.

As described above, the molding of a ZSM-5 type binderless zeolite in which substantially no aluminum is present outside the crystal lattice has never been known to the art.

A method for producing a supported type molding of zeolite by utilizing an inorganic carrier has been also proposed. For example, JP-A-11-165,074 teaches a method which includes supporting a hydrogel composed of tetraethyl orthosilicate, tetraethyl orthotitanate, and tetrapropylammonium hydroxide on a silicon oxide carrier and thereafter treating the supported hydrogel with steam under pressure thereby producing the MFI type crystalline titanosilicate on the carrier. According to this method, the amount of the hydrogel to be supported on the carrier is extremely small because the hydrogel has such a low concentration as to acquire flowability enough for support of the hydrogel on the carrier. The supported type molding of zeolite which is obtained by this method entails the problem of having an extremely low zeolite content.

The beta type zeolite (the BEA type according to the Framework Topology Code adopted by International Zeolite Association) designates the crystalline metallosilicates represented by the crystalline aluminosilicates which have the pores of 12 oxygen-membered ring as disclosed in U.S. Pat. No. 3,308,069.

The moldings of beta type zeolite entail the same problems as the ZSM-5 type zeolite mentioned above. The molding of a binderless zeolite which contains substantially no binder has never been known to the art.

The MEL type zeolite designates crystalline metallosilicates as disclosed in U.S. Pat. No. 3,709,979. The MEL type zeolite is a tetragonal zeolite. The two kinds of intersecting pores which are formed of a 10 oxygen-membered ring are both straight. The openings of these pores are identical ellipses.

Heretofore, the method of hydrothermal reaction has been known as a way of synthesizing the MEL type crystalline metallosilicate. This method uses, as the raw material, a water slurry utilizing tetra-n-butylammonium ion as a template agent. JP-B-05-323,280, for example, teaches a method which includes preparing a water slurry having a SiO$_2$ concentration of about 10 wt. % and permitting uniform mixture by agitation and causing this water slurry to react under hydrothermal conditions (100° C., autogenous pressure) for 23 days thereby effecting crystallization of the MEL type crystalline metallosilicate.

The molding of the MEL type zeolite entails the same problems as the ZSM-5 type zeolite mentioned above. That is, the molding of a binderless zeolite which contains substantially no binder has not been known to the art.

SUMMARY OF THE INVENTION

This invention has been initiated in view of the above problems entailed by the prior art. It is an object of this invention to provide a method for producing a molding of zeolite without inorganic binders.

Another object of this invention is to provide a molding of binderless zeolite.

Yet another object of this invention is to provide use for the molding of binderless zeolite.

This invention concerns a method for producing a molding of binderless zeolite, characterized by exposing to saturated steam a zeolite precursor represented by the formula (1):

$$\text{Si(SDA)}_x M_y Q_z \tag{1}$$

wherein SDA denotes a tetraalkylammonium, M an alkali metal, Q a metal element incorporated in the crystal skeleton of zeolite (except for silicon), x a numeral in the range of 0.001 to 1, y a numeral in the range of 0.0001 to 1, and z a numeral in the range of 0 to 0.5.

This invention concerns a molding of binderless zeolite, characterized by the fact that the zeolite has at least one crystal structure selected from the group consisting of MFI type MEL type, BEA type, and the intergrowth of MFI type and MEL type.

This invention further concerns use of the molding of the binderless zeolite mentioned above as a catalyst for the production of an alkanolamine.

The above and other objects, features and advantages of the present invention will become clear from the following description of the preferred embodiments.

DESCRIPTION OF THE PREFERRED EMBODIMENTS

Figure 1:
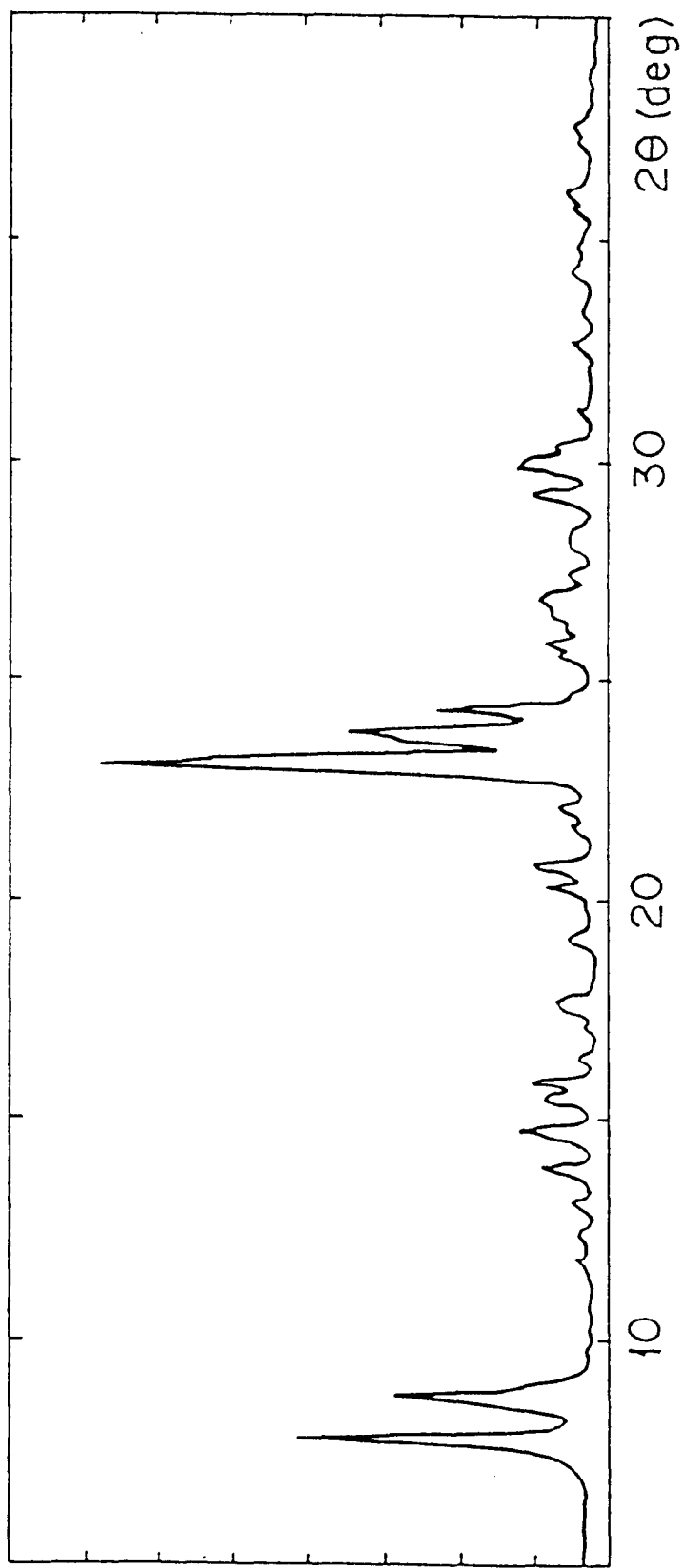
FIG. 1 represents a CuK α X-ray diffraction pattern of a product A.

Now, this invention will be described in detail below.

The MFI type, MEL type, BEA type, and so on concerning zeolite are symbols of the code adopted by International Zeolite Association for designating structures of zeolite.

The zeolite precursor to be used in the production of the molding of binderless zeolite according to this invention is represented by the following formula (1):

$$\text{Si (SDA)}_x M_y Q_z \tag{1}$$

wherein SDA denotes a tetraalkylammonium, the alkyl group thereof preferably having 1 to 5 carbon atoms, M an alkali metal, Q a metal element incorporated in the crystal skeleton of zeolite, x a numeral in the range of 0.001 to 1, y a numeral in the range of 0.0001 to 1, and z a numeral in the range of 0 to 0.5.

Though the preparation of the zeolite precursor is not particularly restricted on account of the type of process used therefor, a method which comprises supporting the raw material substances including a tetraalkylammonium component, an alkali metal component, and a metal (excluding silicon; which applies similarly hereinafter) component optionally incorporated in the crystal skeleton of zeolite on a molding of silica is suitably used therefor.

The ratios (atomic ratios) of the tetraakylammonium component, the alkali metal component, and the metal element component to be incorporated in the crystal skeleton of zeolite, based on silicon taken as 1, may be in the range of 0.001 to 1:0.0001 to 1:0 to 0.5, preferably 0.002 to 0.9:0.0001 to 1:0 to 0.5, and more preferably 0.003 to 0.8:0.0005 to 0.5:0 0.3.

In the method of this invention, a molding of silica is used as the silica source for the zeolite. Though the molding of silica is not particularly restricted, it is preferable to use a molding of silica without binders. Generally, the molding of silica is preferred to have a relatively large specific surface area. The specific surface area found by measuring the adsorption of nitrogen according to the BET method may be not less than 5 m$^2$/g, preferably in the range of 5 to 800 m$^2$/g, and more properly in the range of 20 to 600 m$^2$. If the specific surface area is less than 5 m$^2$/g, it will possibly induce undue elongation of the time required for crystallization and result in lowering the crystallinity. The molding further has pores whose diameter found by the mercury porosimetry method may be generally not less than 4 nm. The specific surface area based on the pore diameter may be in the range of 5 to 800 m$^2$/g, and preferably in the range of 20 to 600 m$^2$/g. The pore volume based on the pore may be in the range of 0.1 to 1.5 mL(ml)/g, and preferably 0.2 to 1.3 mL/g. The shape of the molding, though not particularly limited, may be sphere, cylinder, or ring. Though the size of the molding is not particularly limited, it is generally preferred to be in the range of 0.5 to 10 mm (equivalent in diameter). The mechanical strength of the molding, though not particularly limited, is generally required to be not less than 1 kg and is preferred to be in the range of 1 to 50 kg in terms of the magnitude (average of 10 samples of molding) determined by Kiya's hardness meter in Japan. Since the mechanical strength of the molding of silica correlates with the mechanical strength of the produced molding of binderless zeolite, the use of the molding of silica having high strength allows production of a molding of binderless zeolite which can withstand practical use.

As concrete examples of the tetraalkylammonium component, halides, hydroxides, etc. of tetraethylammonium, tetra-n-propylammonium, tetraisopropylammonium, tetra-n-butylammonium, tetra-n-pentylammonium, triethyl-n-propylammonium, tri-n-propylmethylammonium, tri-n-butylmethylammonium, tetramethylammonium, and triethylmethylammonium may be cited. Among other tetraalkylammonium components mentioned above, the hydroxides of tetramethylammonium, tetraethylammonium, tetra-n-propylammonium, triethylmethylammonium, and tetra-n-butylammonium prove particularly advantageous.

As concrete examples of the alkali metal component, lithium, sodium, and potassium may be cited. Hydroxides and halides of these elements, and alkali metal components in metal salt compounds incorporated in the crystal skeletons of zeolite such as silica carrier and aluminates may be used.

The metal component to be incorporated in the crystal skeleton of zeolite may be at least one element selected from the group consisting of boron, titanium, chromium, iron, cobalt, nickel, copper, zinc, gallium, indium, and aluminum. These metal elements are preferred to be used in the form of salts such as nitrates, sulfates, halides, oxoacid salts, and hydroxides. Further, they are preferred to be used in the form of aqueous solutions. The use of such a metal salt is at an advantage in copiously shortening the time required for the crystallization. These metal components are converted into binderless zeolites by being incorporated in the zeolite skeletons during the course of the crystallization.

The metal component fated to form the T atom (the metal component forming the crystal skeleton of zeolite) to be incorporated in the crystal skeleton of zeolite may be in any form as far as it is supported on the molding of silica. The oxide of the aforementioned metal in the molding of silica, for example, may be used. Generally, the metal salt to be supported is preferred to be in the form of a water-soluble salt. The precursor supported as a metal oxide which is obtained by impregnating the precursor with the aqueous solution of a metal salt, drying the impregnated precursor, and calcining the dried precursor may be used. In this case, the metal component fated to form the T atom and/or the alkali metal component is supported on the molding of silica and the supported component is calcined. Subsequently, a zeolite precursor is obtained by supporting the tetraalkylammonium component thereon and drying the resultant composite. This procedure possibly enables the produced molding of zeolite to heighten its strength.

The method for carrying the raw material substances including the tetraalkylammonium component, the alkali metal component, and the metal element component to be incorporated in the crystal skeleton of zeolite is not particularly restricted. Since the raw material substances are preferred to be supported uniformly in the zeolite precursor, it is generally commendable to use a method which comprises impregnating the silica molding with the aqueous solution of the raw material substances and then drying the wet zeolite precursor. For example, a homogeneous aqueous solution containing the components in prescribed concentrations is prepared in an amount expected to be absorbed by a given molding of silica and is used for impregnating the molding. At this time, the components may be simultaneously supported or the components or the homogenous solution thereof may be supported as split in a number of portions. When this procedure is effected as split, the sequence in which the splits are supported has no effect of any sort on the product.

The temperature at which the molding impregnated with the aqueous solution is to be dried is not particularly limited. It may be set generally in the range of 20 to 120° C. and preferably in the range of 50 to 120° C. from the viewpoint of suppressing decomposition of the tetraalkylammonium salt and efficiently repressing the water content. The water content of the precursor may be set generally at not more than 30% and preferably in the range of 20 to 0.1%, based on the weight of the precursor, with a view to precluding elution of the supported component during the course of crystallization and ensuring a high yield.

The method for drying the impregnated molding is not particularly limited. The drying may be effected under a decreased pressure or under normal pressure. For the sake of simplicity, the drying is preferred to perform in a stream of air under normal pressure.

Next, the zeolite precursor is exposed to saturated steam.

The temperature of the saturated steam is not particularly limited as far as it converts the zeolite precursor into the zeolite. It may be set normally in the range of 80 to 260° C. and preferably in the range of 100 to 230° C. with a view to heightening the speed of crystallization, discouraging decomposition of the tetraalkylammonium component contained, and ensuring production of a molding of binderless zeolite of high crystallinity.

The duration of contact between the precursor and the saturated steam may be set generally at not less than two hours and preferably in the range of 2 to 150 hours. If the duration of the crystallization is unduly short, it will possibly lower the crystallinity. If it is unduly long, it will possibly give rise to a mixed crystal with other zeolite.

The method and the apparatus to be adopted for establishing contact between the zeolite precursor and the saturated steam are not particularly limited but are only required to be capable of effecting conversion of the zeolite precursor to the zeolite. For example, the precursor is placed in the interior of an autoclave vessel. Subsequently, water is poured in the bottom of vessel in an amount equivalent to the amount of the saturated steam to be determined by the reaction temperature and the inner volume of the vessel, the vessel is sealed and heated in an oven. A closed vessel which is adapted to admit the precursor in the inner vessel and place the water outside the inner vessel may be used instead. Alternatively, the zeolite may be continuously synthesized using a moving bed type reaction vessel.

By the method of production according to this invention, the zeolite precursor can be crystallized without requiring itself to be dispersed in water and subjected to a hydrothermal reaction as in the conventional procedure. The raw material substances can be nearly wholly converted into the zeolite. Since the molding of silica as the raw material can be wholly converted into the zeolite while retaining the shape thereof intact, the resultant zeolite contains substantially no binder. In this manner, the molding of binderless zeolite can be readily produced.

The method of this invention has no use for a binder. The molding of binderless zeolite which is synthesized by the method of this invention has a very high crystallinity as evinced by the zeolite content approximating closely to 100%. The crystallinity can be controlled by selecting the percentage compositions of the components of the precursor, the temperature of crystallization, and the duration of crystallization within the relevant ranges mentioned above. The crystallinity of the molding may be, for example, not less than 95%, preferably not less than 98%. The crushing strength of the molding can be controlled by the crystallinity. For example, the crushing strength as determined by Kiya's hardness meter may be not less than 0.5 kg, and preferably not less than 0.8 kg. The pore volume based on the pore range of 150 nm including the average pore diameter indicates a sharp pore distribution of not less than 60%, preferably not less than 70%, of the total macropore volume based on the pore diameters of not less than 4 nm.

Further, the method of production according to this invention can use the molding of silica in an arbitrary shape such as sphere, cylinder, or ring. By converting the precursor prepared from the molding of silica of an arbitrary shape by the method of this invention into the zeolite, the molding of binderless zeolite can be obtained without changing the original shape.

The method of production according to this invention not only retains the appearance of the molding of raw material silica but also reflects the crushing strength, the macropore distribution, and so on. By controlling the solid state physical properties of the molding of silica used as the raw material by an ordinary method, it is possible to control readily the solid state physical properties of the molding of binderless zeolite.

To be specific, the following moldings of binderless zeolite can be obtained:

(1) An aluminum component, a tetraalkylammonium component, and an alkali metal component are supported on a molding of silica as a zeolite precursor to form a molding of a binderless ZSM-5 type aluminosilicate having silicon and aluminum as T atoms. Here, the percentage composition (atomic ratios) of the components is such that the proportions of the aluminum component, the tetraalkylammonium component, and the alkali metal component, based on the molding of silica (as reduced to Si) taken as 1, generally may fall in the range of 0.0001 to 0.5:0.001 to 1:0.0001 to 1, preferably 0.0001 to 0.5:0.002 to 1:0.0001 to 1, and more preferably 0.0005 to 0.3:0.003 to 0.8:0.0005 to 0.5. The tetraalkylammonium component is preferred to be a compound containing tetra-n-propylammonium ion, particularly tetra-n-propylammonium hydroxide. The aluminum component is preferred to be a water-soluble salt. As concrete examples of the water-soluble salt, aluminates, nitrates, sulfates, and halides may be cited. Among these salts, sodium aluminate proves to be particularly desirable. In addition to the three components, at least one metal component selected from the group consisting of boron, titanium, chromium, iron, cobalt, nickel, copper, zinc, gallium, and indium can be supported to form the molding of a binderless ZSM-5 type crystalline metalloaluminosilicate (MFI type of zeolite) incorporating this metal component as the T atom.

(2) A tetraalkylammonium component and an alkali metal component are supported on a molding of silica as a zeolite precursor to produce a molding of binderless ZSM-5 type Silicalite having silicon alone as a T atom. In addition to the two components, at least one metal component selected from the group consisting of iron, boron, titanium, chromium, cobalt, nickel, copper, zinc, gallium, and indium may be supported. In this case, a molding of a binderless ZSM-5 type crystalline metallosilicate (MFI type of zeolite) incorporating the metal component as a T atom can be produced. Here, the percentage composition (atomic ratios) of the components is such that the proportions of the tetraalkylammonium component, the alkali metal component and the metal component, based on the molding of silica (as reduced to Si) taken as 1, generally may fall in the range of 0.001 to 1:0.0001 to 1:0 to 0.5, preferably 0.002 to 1:0.0001 to 1:0 to 0.5, and more preferably 0.003 to 0.8:0.002 to 0.5:0 to 0.3. The tetraalkylammonium component is preferred to be a compound containing tetra-n-propylammonium ion, particularly tetra-n-propylammonium hydroxide.

(3) Tetrabutylammonium as a tetraalkylammonium component and an alkali metal component are supported on a molding of silica as a zeolite precursor to produce a molding of binderless MEL type Silicalite (MEL type of zeolite) having silicon alone as a T atom. In addition to the two components, at least one metal component selected from the group consisting of boron, aluminum, titanium, chromium, iron, cobalt, nickel, copper, zinc, gallium, and indium may be supported. In this case, a molding of MEL type binderless crystalline metallosilicate incorporating this metal component as a T atom can be produced. Here, the percentage composition (atomic ratios) of the components is such that the proportions of the tetraalkylammonium component, the alkali metal component, and the metal component, based on the molding of silica (as reduced to Si) taken as 1, generally may fall in the range of 0.001 to 1:0.0001 to 1:0 to 0.4, preferably 0.002 to 1:0.0001 to 1:0 to 0.3, and more preferably 0.003 to 0.8:0.002 to 0.5:0 to 0.2. As concrete examples of the tetraalkylammonium component, halides and hydroxides of tetra-n-butylammonium may be cited. Among other tetraalkylammonium components mentioned above, tetra-n-butylammonium hydroxide proves particularly advantageous.

In the case of producing a MEL type zeolite, the ratio of presence of the intergrowth of the MEL type and the MFI type can be arbitrarily controlled by the amount of the alkali metal component in the precursor.

(4) Tetraethylammonium as a tetraalkylammonium component and an alkali metal component are supported on a molding of silica as a zeolite precursor to produce a molding of binderless beta type Silicalite (BEA type of zeolite) having silicon alone as a T atom. In addition to the two components, at least one metal component selected from the group consisting of boron, titanium, chromium, iron, cobalt, aluminum, nickel, copper, zinc, gallium, and indium may be supported. In this case, a molding of beta type binderless crystalline metallosilicate (BEA type of zeolite) incorporating this metal component as a T atom is obtained. Here, the percentage composition (atomic ratios) of the components is such that the proportions of the tetraalkylammonium component, the alkali metal component, and the metal component, based on the molding of silica (as reduced to Si) taken as 1, generally may fall in the range of 0.005 to 1:0.0001 to 1:0 to 0.4, preferably 0.001 to 1:0.0001 to 1:0.0005 to 0.3, and more preferably 0.002 to 0.8:0.0002 to 0.5:0.001 to 0.2. As concrete examples of the tetraalkylammonium component, halides and hydroxides of tetraethylammonium may be cited. Among other tetraalkylammonium components mentioned above, tetraethylammonium hydroxide proves particularly advantageous.

As concrete examples of the molding of binderless zeolite according to this invention, the moldings having the MFI type, MEL type, BEA type, and an intergrowth of the MFI type and the MEL type respectively of zeolite may be cited.

The molding of binderless zeolite according to this invention is such that the specific surface area thereof to be found by determining the adsorption of nitrogen by the BET method generally may fall in the range of 250 to 950 m$^2$/g.

The composition ratio (atomic ratio) of silicon and metal as the components of the crystal structure of zeolite is generally such that the zeolite is composed substantially solely of silicon or the proportion of the metal, based on the amount of silicon taken as 1, may be in the range of 0.0001 to 0.5, and preferably 0.0005 to 0.3. Here, as the metal which participates in the construction of the crystal structure of zeolite, at least one element selected from the group consisting of boron, titanium, chromium, iron, cobalt, nickel, copper, zinc, gallium, indium, and aluminum may be cited.

The other components include an alkali metal. As concrete examples of the alkali metal, lithium, sodium, and potassium may be cited.

The molding of binderless zeolite according to this invention has pores whose pore diameter found by the mercury porosimetry method is not less than 4 nm. Generally, the surface area of the pores may be in the range of 2 to 200 m$^2$/g and the pore volume based on the pores may be in the range of 0.10 to 1.5 mL/g.

Then, the molding of binderless zeolite according to this invention is known in various types including molding of binderless aluminosilicate, molding of binderless Silicalite, molding of binderless metallosilicate, and so on. These moldings will be described sequentially below.

(1) Molding of binderless aluminosilicate (crystal structure of the MFI type)

This molding has the following characteristics.

(i) The aluminosilicate has the crystal structure of the ZSM-5 type.

(ii) The percentage composition (atomic ratio) of silicon and aluminum constructing the crystal structure of aluminosilicate is such that the proportion of aluminum, based on silicon taken as 1, may be in the range of 0.0001 to 0.5, preferably 0.0005 to 0.3.

(iii) The content of aluminum outside the crystal lattice is not more than 3% of the whole aluminum contained in the molding.

The aluminosilicate in the molding of this invention has a crystal structure of the ZSM-5 type. This structure can be confirmed by the powder X-ray diffraction method.

The structure of the ZSM-5 type aluminosilicate constitutes itself the crystal skeleton of zeolite. In this skeleton, SiO$_4$ and AlO$_4$ tetrahedrons configured by coordinating four oxygen atoms centering around a silicon atom or an aluminum atom at each of the apexes are linked three-dimensionally. Thus, it is well known that the aluminum atoms entering the zeolite skeleton are invariably in four coordinations, whereas the aluminum atoms outside the lattices departing from the skeleton are generally in six coordinations. These two kinds of aluminum atoms can be readily discriminated or determined, for example, by the determination of Al$^{27}$MAS-NMR. The area of the peak is measured in the range of the chemical shift ($\delta$), 50–70 ppm, belonging to the four-coordination aluminum and the area of the peak measured in the range of the chemical shift ($\delta$), 0 to 10 ppm, belonging to the six-coordination aluminum. Based on the ratio of these areas, the proportion of aluminum outside the lattice to the total amount of aluminum contained in the molding obtained in accordance with this invention is found.

The molding of binderless aluminosilicate according to this invention is characterized by the fact that the aluminum component outside the lattice of zeolite is very small. The amount of aluminum outside the lattice to be calculated by the determination of Al$^{27}$MAS-NMR is not more than 3 wt. %, preferably not more than 2 wt. %, and more preferably nearly 0 wt. % (not detectable) based on the total amount of aluminum in the molding. Incidentally, it is inferred that the non-crystallinity of the molding originates in the silica component which is not converted into the zeolite.

The specific surface area of the molding to be found by determining the adsorption of nitrogen by the BET method may be in the range of 300 to 550 m$^2$/g, preferably 315 to 500 m$^2$/g.

Further, the molding has macropores whose pore diameter to be found by the mercury porosimetry method is not less than 4 nm. The surface area based on the pores may be generally in the range of 2 to 150 m$^2$/g, and preferably 4 to 100 m$^2$/g. The pore volume may be generally in the range of 0.15 to 1.5 mL/g, preferably 0.2 to 1.3 mL/g.

(2) Molding of binderless zeolite (crystal structure of the MFI type, A) (crystal structure of the MFI type, B)

The molding of binderless zeolite (crystal structure of the MFI type, A) of this invention has the following characteristics (i) The zeolite has the crystal structure of the ZSM-5 type.

(ii) The metal component constructing the crystal skeleton consists of silicon substantially.

The term "substantially" used here means that the atomic ratio of the metal component to silicon is such that the proportion of the metal component is less than 0.0001 to the silicon taken as 1 (this definition applicable similarly herein below).

The molding of binderless zeolite (crystal structure of the MFI type, B) has the following characteristics.

(i) The zeolite has the crystal structure of the ZSM-5 type.

(ii) The metal component constructing the crystal skeleton comprises silicon and at least one element selected from the group consisting of iron, boron, titanium, chromium, cobalt, nickel, copper, zinc, gallium, and indium.

(iii) The percentage composition (atomic ratio) of the silicon and the metal component constructing the crystal structure of zeolite is such that the proportion of the metal may be in the range of 0.0001 to 0.5, preferably 0.003 to 0.3, based on the silicon taken as 1.

The zeolite in the molding of binderless zeolite (crystal structure of the MFI type, A) and (the crystal structure of the MFI type, B) has the crystal structure of the ZSM-5 type. This fact can be confirmed, for example, by the determination according to the powder X-ray diffraction method. In the zeolite structure of the ZSM-5 type, the crystal skeleton of zeolite is formed. In this skeleton, TO$_4$ tetrahedrons configured by coordinating four oxygen atoms centering around a T atom at each of the apexes are linked three-dimensionally. The Silicalite which has the T atom formed solely of silicon, therefore, manifests no solid acidity because it is electrically neutral. When part of Si$^{4+}$ therein is substituted with a metal of other valency, the crystal thereof permits occurrence of a cation such as a proton because the TO$_4$ anion is electrically neutralized. It is known that the solid acidity is manifested because of the presence of cation. The amount of acid of the solid acidity so manifested and the strength of the acid can be controlled by the amount and the kind of the metal element to be introduced as the T atom. The solid acidity can be evaluated, for example, by the method of ammonia temperature-programmed desorption (TPD).

The molding of binderless zeolite (crystal structure of the MFI type, A) according to this invention is a molding of zeolite incorporating no other element than silicon as the T atom. The molding of binderless Silicalite of the ZSM-5 type may be cited as one concrete example.

The specific surface area of this molding to be found by the determination of adsorption of nitrogen according to the BET method, for example, may be in the range of 300 to 550 $m^2/g$, preferably 315 to 500 $m^2/g$.

This molding has macropores whose pore diameter to be found by the mercury porosimetry method is not less than 4 nm. The surface area based on the pores may be generally in the range of 2 to 150 $m^2/g$, and preferably in the range of 4 to 100 $m^2/g$. The pore volume based on the pores may be generally in the range of 0.15 to 1.5 mL/g, and preferably in the range of 0.2 to 1.3 mL/g.

(3) Molding of binderless zeolite (crystal structure of the MEL type)

The molding of binderless zeolite (crystal structure of the MEL type) according to this invention has the following characteristics.

(i) The zeolite has the crystal structure of the MEL type.
(ii) The metal component constructing the crystal skeleton consists of silicon substantially.

Otherwise, (i) The zeolite has the crystal structure of the MEL type.
(ii) The percentage composition (atomic ratio) of the silicon and the metal element which participate in the construction of the crystal structure of zeolite is such that the proportion of the metal may be in the range of 0 to 0.4, preferably 0.0005 to 0.2, based on the silicon taken as 1. The term "metal" as used herein means at least one element selected from the group consisting of boron, aluminum, titanium, chromium, iron, cobalt, nickel, copper, zinc, gallium, and indium.

The molding of binderless zeolite (crystal structure of the MEL type) according to this invention has the crystal structure of the MEL type. This identification can be attained by the powder X-ray diffraction method. The solid acidity of this molding is the same as the molding of binderless zeolite mentioned in (2) above.

The specific surface area of this molding as found by the adsorption of nitrogen according to the BET method, for example, may be in the range of 250 to 550 $m^2/g$, preferably 270 to 525 $m^2/g$.

Further, the molding has macropores whose pore diameter to be found by the mercury porosimetry method is not less than 4 nm. The surface area based on the pores may be generally in the range of 0.10 to 1.5 mL/g, preferably 0.13 to 1.3 mL/g.

(4) Molding of binderless zeolite (crystal structure of the BEA type)

The molding of binderless zeolite (crystal structure of the BEA type) has the following characteristics.

(i) The zeolite has the crystal structure of the BEA type.
(ii) The metal component which participates in the construction of the crystal skeleton comprises silicon substantially alone.

Otherwise, (i) The zeolite has the crystal structure of the BEA type.
(ii) The percentage composition (atomic ratio) of the silicon and the metal element which participate in the construction of the crystal structure of zeolite is such that the proportion of the metal may be in the range of 0.0005 to 0.4, preferably 0.001 to 0.2, based on the silicon taken as 1. The term "metal" as used herein means at least one element selected from the group consisting of boron, titanium, chromium, aluminum, iron, cobalt, nickel, copper, zinc, gallium, and indium.

The molding of binderless zeolite (crystal structure of the BEA type) according to this invention has the crystal structure of the BEA type. This identification can be attained by the powder X-ray diffraction method. The solid acidity of this molding is the same as the molding of binderless zeolite mentioned in (2) above.

The specific surface area of this molding as found by the adsorption of nitrogen according to the BET method, for example, may be in the range of 300 to 950 $m^2/g$, preferably 320 to 850 $m^2/g$.

Further, the molding has macropores whose pore diameter to be found by the mercury porosimetry method is not less than 4 nm. The surface area based on the pores may be generally in the range of 2 to 200 $m^2/g$, preferably 3 to 170 $m^2/g$. The pore volume based of the pores may be generally in the range of 0.10 to 1.5 mL/g, preferably 0.13 to 1.3 mL/g.

The molding of binderless zeolite according to this invention can be utilized as a catalyst, an adsorbent, or a catalyst carrier. It can be used advantageously, for example, as a catalyst for the reaction of amination, as a catalyst for the reaction of alkylation, as a catalyst for the reaction of isomerization, as a catalyst for the reaction of cracking, as a catalyst for the reaction of Beckmann rearrangement, as a catalyst for the reaction of hydration, and as a catalyst for the reaction of alcohol addition.

When the conventional molding of zeolite containing an inorganic binder is used as a catalyst, the catalyst is at a disadvantage in having lower catalytic activity than the inherent zeolite catalyst, manifesting inferior strength as a molding, and giving rise to various defiled by-products. The molding of binderless zeolite according to this invention is commendable in respect that it is devoid of such defects and capable of manifesting the catalytic activity inherent in zeolite.

Further, since the inorganic binder exerts its adverse effects deeply on various reactions of amination, it is commendable to use a molding of binderless zeolite of this invention as a catalyst. As concrete examples of the reaction of amination, the reaction for synthesizing an alkanolamine by the amination of an alkylene oxide with ammonia, the reaction for adding ammonia to an olefin, the reaction for N-alkylation with alcohol represented by the synthesis of methylamine, the reaction for cyclic dehydration of ethanolamine, and the reaction for synthesis of ethylenediamine from monoethanolamine and ammonia may be cited. For the reaction of synthesis of an alkanolamine by the amination of an alkylene oxide with ammonia, the reaction conditions heretofore known to the art may be adopted. The following conditions are preferably adopted.

The molar ratio of ammonia and an alkylene oxide may be generally in the range of 1 to 50:1, preferably 2 to 40:1. The reaction temperature may be generally in the range of 20 to 300° C., preferably 30 to 200° C. The reaction pressure may be generally in the range of 2 to 30 MPa, preferably 4 to 20 MPa. The LHSV ($hr^{-1}$) may be generally in the range of 0.1 to 50, preferably 0. 5 to 30.

As a concrete example of the reaction for synthesizing an alkanolamine, the process for the production of ethanolamines from ethylene oxide and ammonia may be cited. Generally, when the zeolite catalyst which is formed with an inorganic binder is used, it entails such problems as degrading activity, forming such defiling by-products as diglycolamines, betraying inferior strength as a molding, and suffering a decline in the selectivity for diethanolamine, for example. These defects are ascribable to the dilution of the catalytic component caused by the addition of the inorganic binder and the chemical property of the inorganic binder. It is, therefore, particularly commendable to use, as a catalyst or a catalyst carrier, the molding of binderless zeolite of this invention which contains substantially no inorganic binder and has fully satisfactory strength. In this case, the crystal structure of zeolite is preferred to be of the MFI type, the MEL type, or the intergrowth thereof in respect of manifesting high selectivity for diethanolamine.

EXAMPLES

Now, this invention will be described specifically below with reference to examples. It should be noted, however, that this invention is not limited to these examples.

Incidentally, the numerical values reported in the examples are the results obtained by the following methods of determination.

Method for Determination of Mechanical Strength

This determination is effected by Kiya's hardness meter (in Japan). The average of the numerical values obtained of 10 samples of molding is reported.

Method for Determination of Content of Zeolite

The identification is effected by the powder X-ray diffraction method. The zeolite content is determined as the ratio of the peak areas belonging to zeolite to the total peak areas confirmed by the CuK α X-ray diffraction performed at $2\theta=5$ to $140°$. The expression "zeolite content of nearly 100%" means that the determination performed under the conditions mentioned above fails to detect any peak other than the peaks of zeolite.

Method for Determination of Crystallinity

The identification is also effected by the powder X-ray diffraction method. The crystallinity is determined as the ratio of the area belonging to zeolite to the halo area of an amorphous origin. Since this method of analysis produces results which possibly vary widely with the characteristics of the apparatus used for the analysis, the reference catalyst distributed by the Catalysis Society of Japan is utilized as a standard sample.

In the case of the ZSM-5 type zeolite, "JRC-Z5-90H(1)" is adopted and samples obtained by mixing it with amorphous silica (for example, a pulverized material of a product available from FUJI SILYSIA CHEMICAL LTD. in Japan, type "CARiACT Q-50") at arbitrary ratios are used as standard samples to form a calibration curve. The crystallinity of a given molding of the ZSM-5 type zeolite is found by measuring the crystallinity under the same conditions as those used during the formation of the calibration curve.

In the case of the BEA type zeolite, the crystallinity is determined in the same manner as in the case of the ZSM-5 type zeolite by adopting "JRC-HB25 (1)" as a standard sample.

In the case of the MEL type zeolite, the crystallinity is determined in the same manner as in the case of the ZSM-5 type zeolite by using as a standard sample the powdered zeolite obtained by the method disclosed in U.S. Pat. No. 3,709,979.

Determination of Pore Distribution

The macropore distribution is calculated from the pore distribution curve using pore diameters determined by the of mercury porosimetry method. The maximum value obtained during the differentiation of the pore distribution curve is designated as average pore diameter.

In the molding of binderless zeolite according to this invention, the pore volume embracing the average pore diameter and falling within the range of 150 nm have a sharp pore distribution of not less than 60%, preferably not less than 70%, of all the macropore volumes based on the pore diameters of not less than 4 nm.

Example I-1

1.09 g of Sodium aluminate was dissolved in 22.93 g of an aqueous 1 mol/L (liter) tetra-n-propylammonium hydroxide (hereinafter referred to briefly as "TPAOH") solution. The resultant solution was diluted with distilled water to a total volume of 30 mL. In 30 mL of the aqueous solution, 20.42 g of silica beads (available from FUJI SILYSIA CHEMICAL LTD. in Japan, type "CARiACT Q-50", 10–20 mesh, 80 $m^2$/g in the specific surface area, 1 ml/ in the pore volume, average pore diameter 50 nm, and mechanical strength 3 kg) dried at $120°$ C. overnight were immersed for one hour. The sodium aluminate and the TPAOH were supported on the silica beads. The atomic composition of this product was $Si_1Al_{0.03}Na_{0.04}TPA_{0.07}$.

This product was transferred onto an evaporating basin. It was dried on a water bath at $100°$ C. and then dried in an oven at $80°$ C. under a current of nitrogen for five hours. The precursor thus obtained was placed in a cup made of polytetrafluoroethylene. The cup containing the precursor was installed in an inner space of a closed vessel which is a jacketed crucible of polytetrafluoroethylene having an inner volume of 100 mL. The crucible, with 1.00 g of distilled water being placed in the bottom thereof, was heated at $180°$ C. for eight hours. The crucible was cooled to room temperature. The product removed from the crucible was placed in a column. The column filled with the product was washed with 500 mL of distilled water and dried at $120°$ C. for five hours. The resultant white solid was calcined in a current of air at $540°$ C. for 3.5 hours. After removal of the excess organic component, 20.75 g of a white product was obtained. This product was labeled as "Product A."

Product A retained the appearance of the silica beads used as the raw material and consisted of beads 10–20 mesh in particle size. Product A was pulverized and then the particles were analyzed by the powder X-ray diffraction method. It was identified to be the ZSM-5 type zeolite as illustrated in FIG. 1. The zeolite content of this product was nearly 100%.

As a result of the determination of the crystallinity using "JRC-Z5-90H(1)" as a standard sample, the crystallinity of Product A was found to be 100%.

Figure 2:
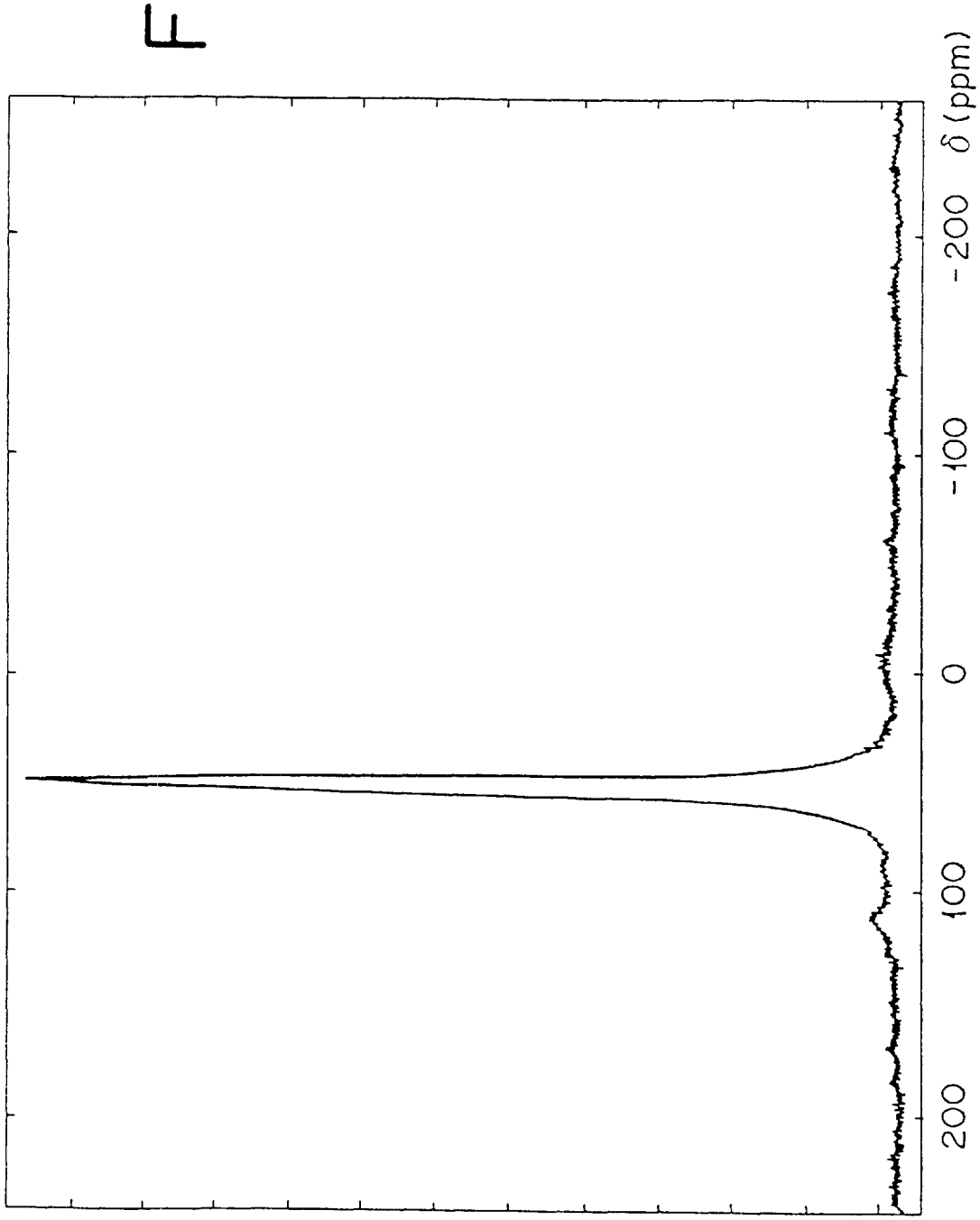
FIG. 2 represents an Al$^{27}$MAS-NMR spectrum of the product A.

Product A was analyzed by the $Al^{27}$MAS-NMR to show the result in FIG. 2. Consequently, no signal was found based on the aluminum outside the lattice of zeolite. Only a signal of $\delta=54.7$ ppm belonging to the aluminum within the lattice was observed except side signals. It is clearly noted that the aluminum supported on the silica beads was wholly taken into the skeleton. That is, Product A was identified as an aluminosilicate of the ZSM-5 type.

Figure 3:
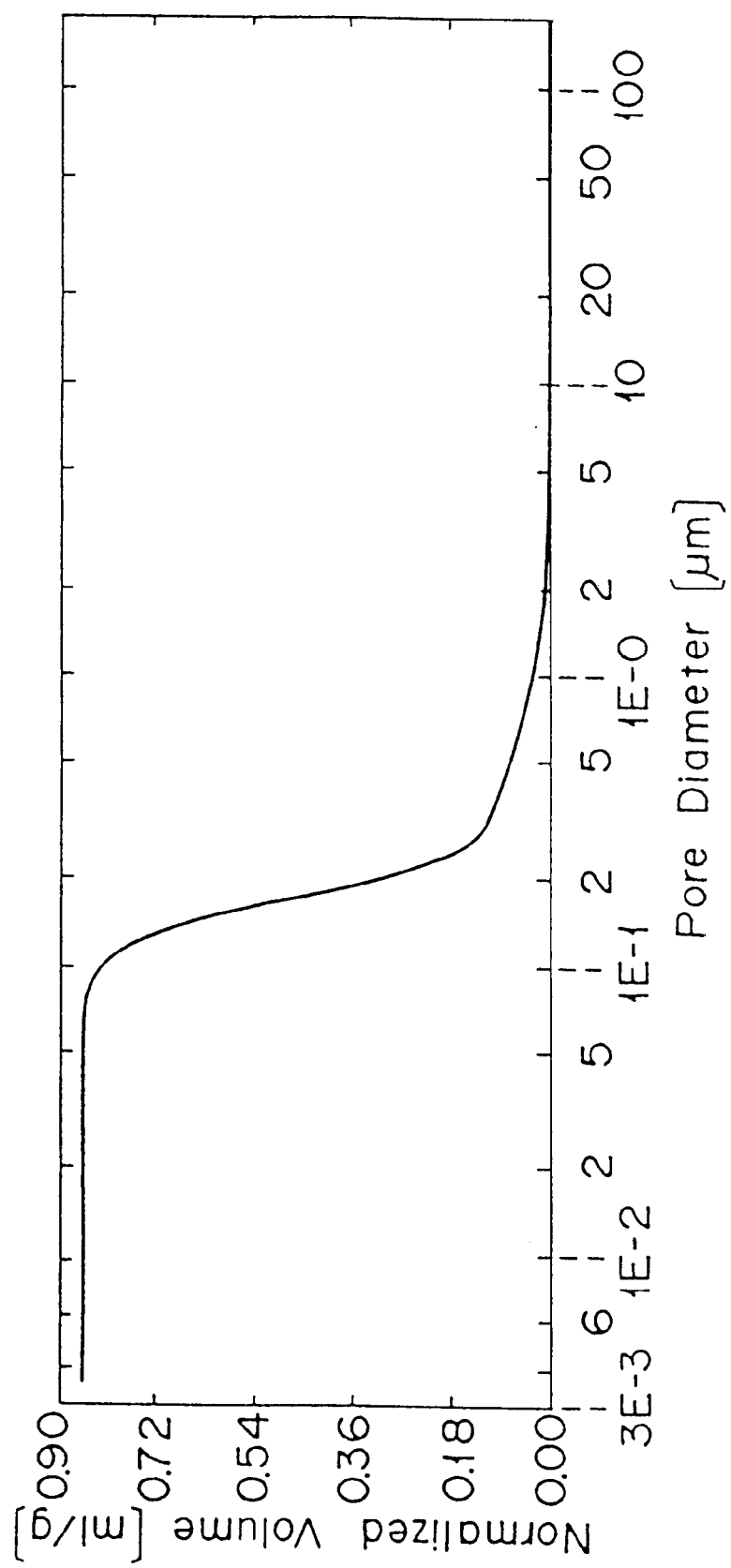
FIG. 3 represents a pore distribution curve of the product A y the mercury porosimetry method.

The specific surface area determined by the BET three-point method (P/PO=0.01, 0.03, 0.06) with nitrogen at 77K was 360 $m^2$/g. When the pore distribution was determined by the mercury porosimetry method, the pore distribution curve illustrated in FIG. 3 was obtained. In FIG. 3, IE–1 means $1*10^{-1}$ and 3E–3 means $3*10^{-3}$, for example. The total macropore volume, not less than 4 nm in pore diameter, was 0.85 mL/g and the surface area of the same macropores was 28 $m^2$/g. The pore volume of the pores having diameters in the range of 100–250 nm (average pore diameter 150 nm) was 0.68 mL/g. It is, therefore, noted that the pore distribution was exceptionally sharp as evinced by the fact that the pores occupied about 80% of the total volume of macropores not less than 4 nm in diameter.

The mechanical strength of the molding obtained was 1.0 kg.

Example I-2

1.35 g of sodium aluminate was dissolved in 84.29 g of an aqueous 1 mol/L TPAOH solution. By immersing 25.05 g of silica beads (available from FUJI SILYSIA CHEMICAL LTD. in Japan, type "CARiACT Q-50", 10–20 mesh) dried in advance overnight at 120° C. in the aqueous solution for one hour and evaporating the resultant mixture to dryness and meanwhile stirring it, the sodium aluminate and the TPAOH were uniformly supported on the silica beads. The atomic composition of the product thus obtained was $Si_1Al_{0.03}Na_{0.04}TPA_{0.20}$. By treating this product in the same manner as in Example I-1, 25.44 g of a white product was obtained. This was labeled as "Product B1."

Product B1 retained the appearance of the silica beads used as the raw material and consisted of beads 10–20 mesh in particle size. Product B1 was pulverized and the produced particles were analyzed by the powder X-ray diffraction method. The result was substantially the same as that in FIG. 1. Product B1 was identified as an aluminosilicate of the ZSM-5 type.

Product B1 was analyzed by the $Al^{27}$ MAS-NMR. As a result, no signal was found based on the aluminum outside the zeolite lattice. The specific surface area determined by the BET three-point method (P/PO =0.01, 0.03, 0.06) with the nitrogen at 77K was found to be 422 $m^2/g$. The pore distribution was determined by the mercury porosimetry method, and the result that the total macropore volume, not less than 4 nm in pore diameter, was found to be 1.0 mL/g and the surface area based on the micropores was found to be 20 $m^2/g$.

Example I-3

The treatment of the silica beads was performed by following the procedure of Example I-1 while using 6.91 g of an aqueous 10 wt. % TPAOH solution instead of the aqueous 1 mol/L TPAOH solution and changing the atomic composition of support to $Si_1Al_{0.03}Na_{0.04}TPA_{0.01}$. Consequently 20.70 g of a white product was obtained. This was labeled as "Product C1."

Product C1 retained the appearance of the silica beads used the raw material and consisted of beads 10–20 mesh in particle size. Product C1 was pulverized and the resultant particles were analyzed by the powder X-ray diffraction method. The diffraction pattern obtained was substantially the same as that in FIG. 1, though the crystallinity was slightly lower. Product C1 was identified to be an aluminosilicate of the ZSM-5 type.

Product C1 was analyzed by the $Al^{27}$ MAS-NMR. As a result, no signal was found derived from the aluminum outside the zeolite lattice. The specific surface area determined by the BET 3-point method (P/PO=0.01, 0.03, 0.06) with the nitrogen at 77K was found to be 400 $m^2/g$. The pore distribution was determined by the mercury porosimetry method, with the result that the total macropore volume based on the pores not less than 4 nm in diameter was found to be 1.1 mL/g and the surface area based on the macropores found to be 27 $m^2/g$.

Example I-4

The treatment of silica beads was carried out by following the procedure of Example I-1 while changing the atomic composition of support to $Si_1Al_{0.20}Na_{0.26}TPA_{0.07}$ by using 6.54 g of sodium aluminate and changing the conditions for crystallization to 180° C. and three hours. Consequently, 26.60 g of a white product was obtained. This product was labeled as "Product D1."

Product D1 retained the appearance of the silica beads used as the raw material, and consisted of beads 10–20 mesh in particle size. Product D1 was pulverized and the resultant particles were analyzed by the powder X-ray diffraction method. The diffraction pattern obtained was substantially the same as that in FIG. 1, though the crystallinity was slightly lower. Product D1 was identified to be an aluminosilicate of the ZSM-5 type.

Product D1 was analyzed by the $Al^{27}$ MAS-NMR. As a result, no signal was found based on the aluminum outside the zeolite lattice. The specific surface area determined by the BET 3-point method (P/PO=0.01, 0.03, 0.06) with the nitrogen at 77K was found to be 410 $m^2/g$. The pore distribution was determined by the mercury porosimetry method, with the result that the total macropore volume based on the pores not less than 4 nm in diameter was found to be 0.79 mL/g and the surface area based on the macropores was found to be 15 $m^2/g$.

Example I-5

The treatment of silica beads was performed by following the procedure of Example I-1 while changing the conditions for crystallization to 160° C. and eight hours. Consequently, 20.70 g of a white product was produced. This product was labeled as "Product E1."

Product E1 retained the appearance of the silica beads used as the raw material, and consisted of beads 10–20 mesh in particle size. Product E1 was pulverized and the resultant particles were analyzed by the powder X-ray diffraction method. The diffraction pattern obtained was substantially the same as that in FIG. 1, though the crystallinity was slightly lower. Product E1 was identified to be an aluminosilicate of the ZSM-5 type.

Product E1 was analyzed by the $Al^{27}$ MAS-NMR. As a result, no signal was found based on the aluminum outside the zeolite lattice. The specific surface area determined by the BET 3-point method (P/PO=0.01, 0.03, 0.06) with the nitrogen at 77K was found to be 450 m2/g. The pore distribution was determined by the mercury porosimetry method, with the result that the total macropore volume based on the pores not less than 4 nm in diameter was found to be 1.0 mL/g and the surface area based on the macropores was found to be 40 $m^2/g$.

Example I-6

To 5.00 g of a colloidal silica solution (available from NISSAN CHEMICAL INDUSTRIES, LTD. in Japan, type "Snowtex S", $SiO_2$ content 30 wt. %), 0.3 mL of an aqueous 4 mol/L sodium hydroxide solution and 9.14 g of an aqueous 1 mol/L TPAOH solution were added as kept stirred meanwhile. The resultant mixture was stirred at room temperature for 30 minutes. Then, an aqueous solution of 0.31 g of aluminum nitrate nonahydrate in 5 g of distilled water was added dropwisely to the stirred mixture. The resultant aqueous slurry as the raw material mixture was stirred for two hours. Thereafter, 13.50 g of silica beads (available from FUJI SILYSIA CHEMICAL LTD. in Japan, type "CARiACT Q-50", 10–20 mesh in particle size) were impregnated with the aqueous slurry for one hour. The atomic composition of the resultant product was $Si_1Al_{0.003}Na_{0.005}TPA_{0.04}$. This product was treated in the same manner as in Example I-1 to afford 16.20 g of a white product. This was labeled as "Product F1."

Product F1 retained the appearance of the silica beads used as the raw material, and consisted of beads 10–20 mesh in particle size. Product F1 was pulverized and the resultant particles were analyzed by the powder X-ray diffraction method. The diffraction pattern obtained was substantially the same as that in FIG. 1. Product F1 was identified to be an aluminosilicate of the ZSM-5 type.

Product F1 was analyzed by the $Al^{27}$ MAS-NMR. As a result, no signal was found based on the aluminum outside the zeolite lattice. The specific surface area determined by the BET 3-point method (P/PO=0.01, 0.03, 0.06) with the nitrogen at 77K was found to be 330 $m^2/g$. The pore distribution was determined by the mercury porosimetry method, with the result that the total macropore volume based on the pores not less than 4 nm in diameter was found to be 0.81 mL/g and the surface area based on the macropores was found to be 14 $m^2/g$.

Example I-7

The treatment of silica beads (available from FUJI SILYSIA CHEMICAL LTD. in Japan, type "CARiACT Q-10", 10–20 mesh in particle size, 100 $m^2/g$ in the specific surface area, 1 ml/g in the pore volume, 10 nm in average pore diameter, and 3 kg in mechanical strength) was performed by following the procedure of Example I-1 while changing the amount of silica beads to 22.93 g. Consequently, 21.00 g of a white product was obtained, labeled as "Product G1."

Product G1 retained the appearance of the silica beads used as the raw material, and consisted of beads 10–20 mesh in particle size. Product G1 was pulverized and the resultant particles were analyzed by the powder X-ray diffraction. The diffraction pattern obtained was substantially the same as that in FIG. 1. Product G1 was identified to be an aluminosilicate of the ZSM-5 type.

Figure 4:
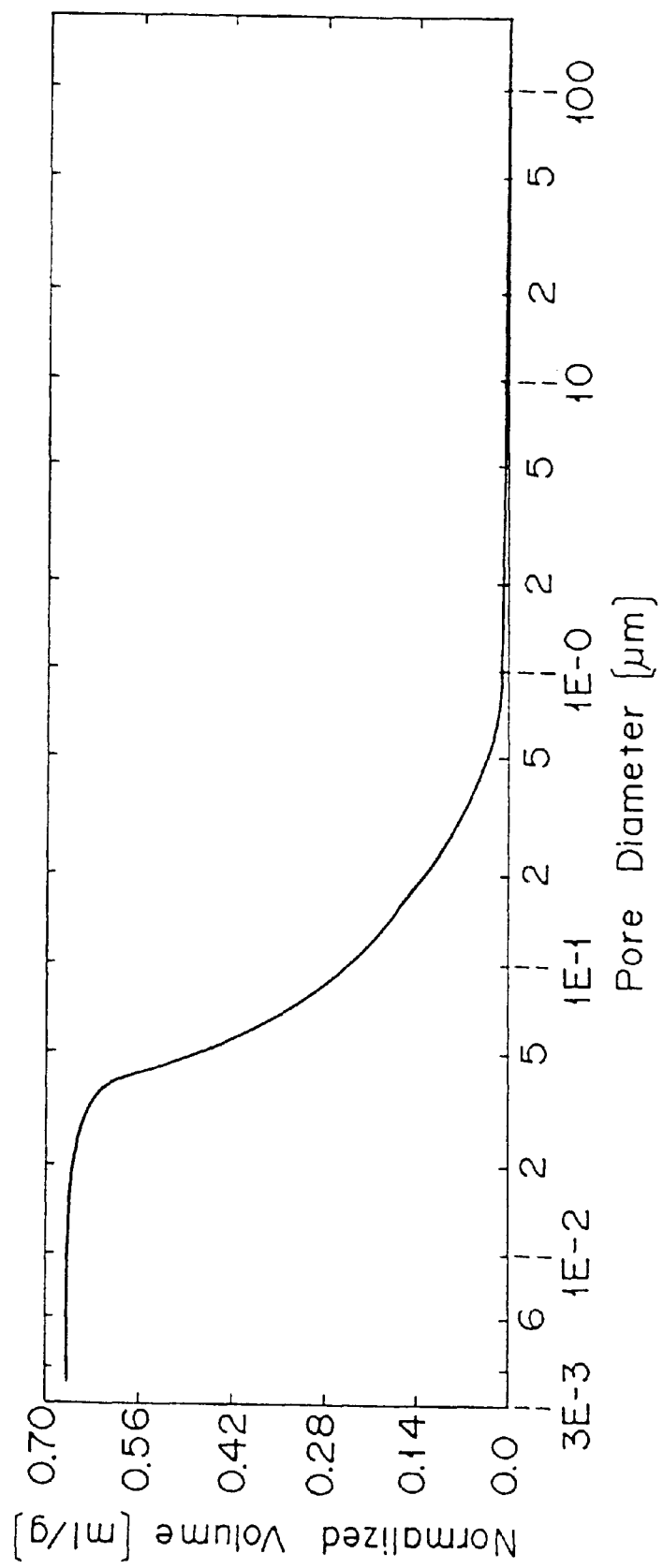
FIG. 4 represents a pore distribution curve of a product G1 by the mercury porosimetry method.

The specific surface area determined by the BET 3-point method (P/PO=0.01, 0.03, 0.06) with the nitrogen at 77K was found to be 370 $m^2/g$. The pore distribution was determined by the mercury porosimetry method, with the result that, the pore distribution curve illustrated in FIG. 4 was obtained, the total macropore volume based on the pores not less than 4 nm in diameter was found to be 0.67 mL/g, the surface area based on the macropores was found to be 30 $m^2/g$, and the pore volume based on the pores having pore diameters in the range of 30–130 nm (average pore diameter 45 nm) was 0.57 mL/g. Thus, Product G1 was found to have an exceptionally sharp pore distribution as evinced by the fact that the pores occupied about 85% of the volume of all the macropores not less than 4 nm in diameter.

Example I-8

The treatment of silica beads (available from FUJI SILYSIA CHEMICAL LTD. in Japan, type "CARiACT Q-50", 5–10mesh in particle size, 80 $m^2/g$ in the specific surface area, 1 ml/g in the pore volume, 50 nm in average pore diameter, and 6 kg in mechanical strength) was performed by following the procedure of Example I-1 while changing the amount of silica beads to 22.93 g. Consequently, 22.00 g of a white product was obtained. It was labeled as "Product H1."

Product H1 retained the appearance of the silica beads used as the raw material, and consisted of beads 5–10 mesh in particle size. Product H1 was pulverized and the resultant particles were analyzed by the powder X-ray diffraction. The diffraction pattern obtained was substantially the same as that in FIG. 1. Product H1 was identified to be an aluminosilicate of the ZSM-5 type. The zeolite content was nearly 100%.

The crystallinity of Product H1 determined by using "JRC-Z5-90H(1)" as a standard sample was found to be 100%.

The specific surface area determined by the BET 3-point method (P/PO=0.01, 0.03, 0.06) with the nitrogen at 77K was found to be 365 $m^2/g$. The pore distribution was determined by the mercury porosimetry method, with the result that the volume of all the macropores not less than 4 nm in diameter was 0.94 mL/g and the surface area based on the macropores was 25 $m^2/g$.

The mechanical strength of the molding obtained was 4.0 kg.

Example II-1

9.84 mL of an aqueous 0.2 mol/L sodium hydroxide solution was dissolved in 26.70 g of an aqueous 10 wt. % tetra-n-propylammonium hydroxide (hereinafter referred to briefly as "TPAOH") solution. Then, the resultant solution was diluted with distilled water to a total volume of 33 mL. In 33 mL of the aqueous solution mentioned above, 23.67 g of silica beads (available from FUJI SILYSIA CHEMICAL LTD. in Japan, type "CARiACT Q50" 10–20 mesh in particle size) dried in advance overnight at 120° C. were immersed for one hour to support the sodium hydroxide and the TPAOH on the silica beads. The atomic composition of support was $Si_1Na_{0.005}TPA_{0.03}$.

The silica beads carrying the support were transferred onto an evaporating basin. They were dried over a hot water bath at 100° C. and then dried in an oven at 80° C. under a current of nitrogen for five hours. The precursor obtained was placed in a cup made of polytetrafluoroethylene. The cup containing the precursor was installed in the empty space of a closed vessel which is a jacketed crucible of polytetrafluoroethylene having an inner volume of 100 mL. The crucible, with 1.00 g of distilled water being placed in the bottom thereof, was heated at 180° C. for eight hours. The crucible was cooled to room temperature. A column was packed with the removed product, washed with 500 mL of distilled water, and then dried at 120° C. for five hours. A white solid consequently obtained was calcined in a current of air at 540° C. for 3.5 hours to expel the excess organic component and obtain 20.75 g of a white product. It was labeled as "Product A2."

Figure 5:
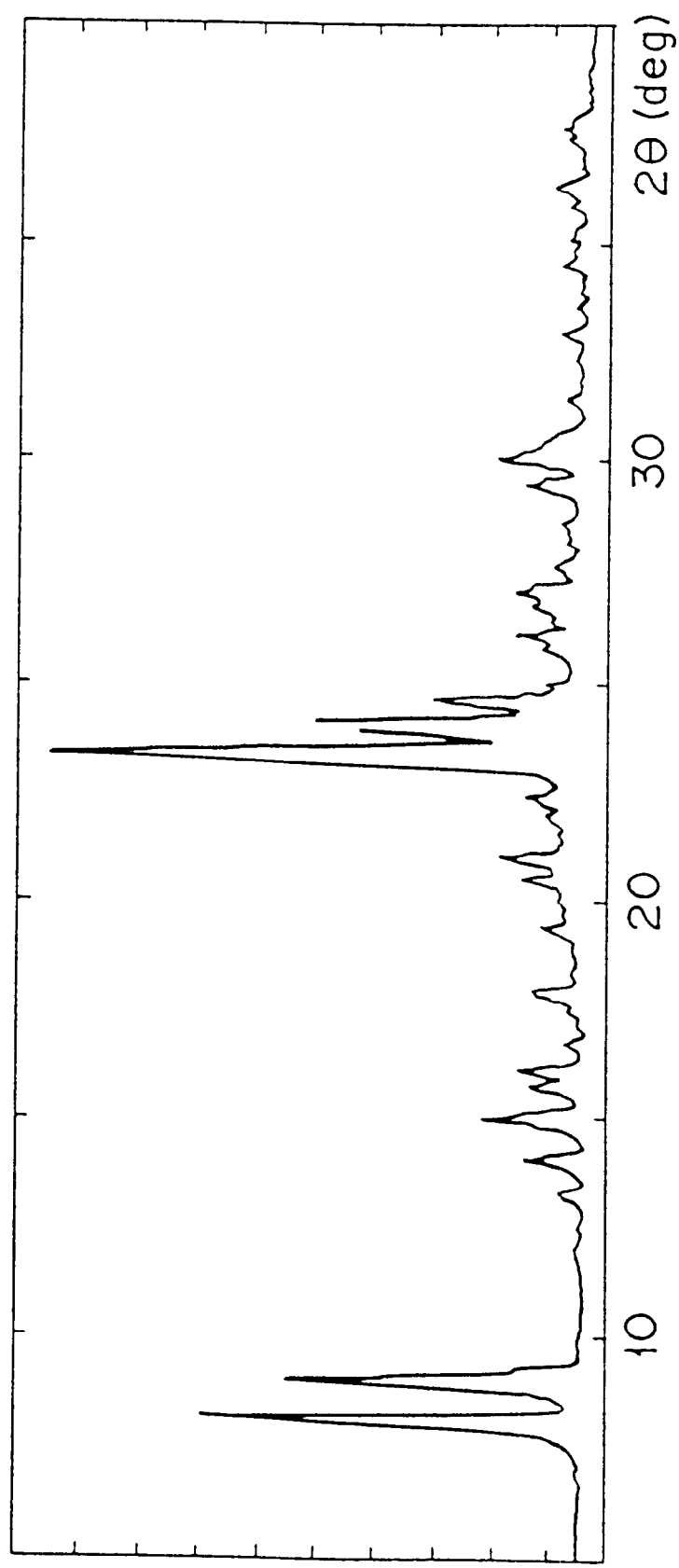
FIG. 5 represents a CuK α X-ray diffraction pattern of a product A2.

Product A2 retained the appearance of the silica beads used as the raw material, and consisted of beads 10–20 mesh in particle size. Product A2 was pulverized and the resultant particles were analyzed by the powder X-ray diffraction method. This product was identified as Silicalite of the ZSM-5 type as illustrated in FIG. 5. The zeolite content was nearly 100%.

The crystallinity of Product A2 determined by using "JRC-Z5-90H(1)" as a standard sample was found to be 100%.

Figure 6:
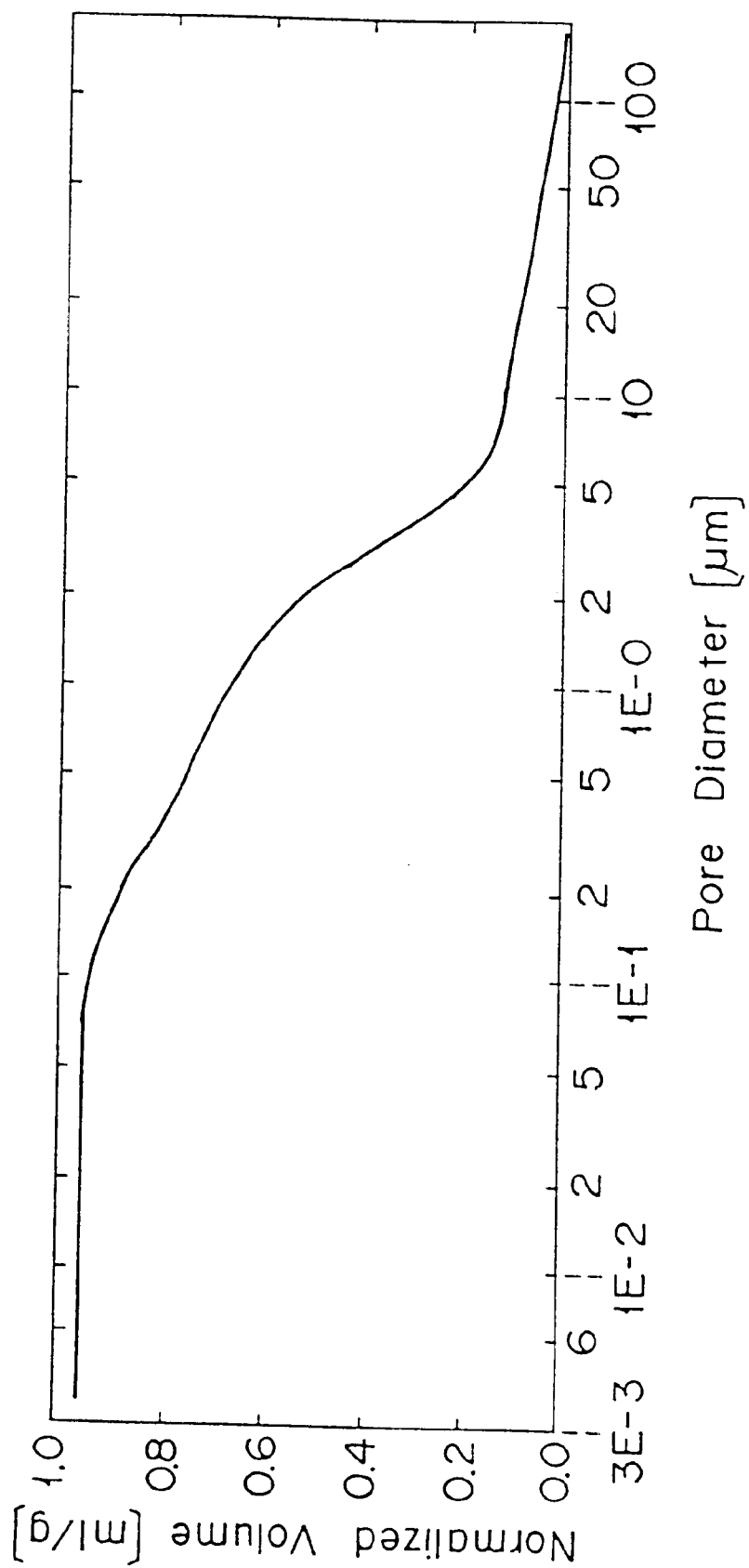
FIG. 6 represents a pore distribution curve of the product A2 by the mercury porosimetry method.

The specific surface area determined by the BET 3-point method (P/PO=0.01, 0.03, 0.06) with the nitrogen at 77K was found to be 350 $m^2/g$. The pore distribution was determined by the mercury porosimetry method, with the result that the pore distribution curve illustrated in FIG. 6 was obtained, the volume of all the macropores not less than 4 nm in diameter was 1.10 mL/g and the surface area based on the macropores was 15 $m^2/g$.

Example II-2

The treatment of the silica beads was performed by following the procedure of Example II-1 while changing the atomic composition of support to $Si_1Na_{0.03}TPA_{0.03}$ by using 3.28 mL of an aqueous 4 mol/L sodium hydroxide solution instead of the aqueous 0.2 mol/L sodium hydroxide solution. Consequently 23.98 g of a white product was obtained. It was labeled as "Product B2."

Product B2 retained the appearance of the silica beads used as the raw material, and consisted of beads 10–20 mesh in particle size. Product B2 was pulverized and the resultant particles were analyzed by the powder X-ray diffraction method. The diffraction pattern obtained was substantially the same as that in FIG. 5. It was identified as Silicalite of the ZSM-5 type. The zeolite content was nearly 100%.

The crystallinity of Product B2 determined by using "JRC-Z5-90H(1)" as a standard sample was found to be 100%.

The specific surface area determined by the BET 3-point method (P/PO=0.01, 0.03, 0.06) with the nitrogen at 77K was found to be 370 $m^2/g$. When the pore distribution was determined by the mercury porosimetry method, the volume of all the macropores not less than 4 nm in diameter was 0.92 mL/g and the surface area of the macropores was 5.6 $m^2/g$.

Example II-3

4.75 g of iron nitrate (III) nonahydrate was dissolved in a distilled water till dilution to a total volume of 30 mL. In this solution, 21.18 g of silica beads (available from FUJI SILYSIA CHEMICAL LTD. in Japan, type "CARRiACT Q-50", 10–20 mesh in particle size) dried in advance overnight at 120° C. were immersed for one hour. The wet silica beads were dried overnight at 120° C. Then, they were immersed for one hour in a mixed solution of 21.75 g of an aqueous 1 mol/L TPAOH solution and 3.9 mL of an aqueous 4 mol/L sodium hydroxide solution (diluted with distilled water to a total volume of 30 mL). The aluminum hydroxide and the TPAOH were supported on the silica beads. The atomic composition of support was $Si_1Na_{0.005}TPA_{0.07}Fe_{0.03}$.

The silica beads carrying the support was treated in the same manner as in Example II-1 to obtain 22.98 g of a light brown product. This product was labeled as "Product C2."

Product C2 retained the appearance of the silica beads used as the raw material, and consisted of beads 10–20 mesh in particle size. Product C2 was pulverized and the resultant particles were analyzed by the powder X-ray diffraction method. The diffraction pattern obtained was substantially the same as illustrated in FIG. 5. It was identified as ferrisilicate of the ZSM-5 type. The zeolite content was nearly 100%.

The crystallinity of Product C2 determined by using "JRC-Z5-90H(1)" as a standard sample was found to be 98.5%.

The specific surface area determined by the BET 3-point method (P/PO=0.01, 0.03, 0.06) with the nitrogen at 77K was found to be 465 $m^2/g$. When the pore distribution was determined by the mercury porosimetry method, the volume of all the macropores not less than 4 nm in diameter was 0.78 mL/g and the surface area of the macropores was 18 $m^2/g$.

Comparative Example II-1

An experiment was performed by following the procedure of Example II-1 while omitting sodium hydroxide and changing the atomic composition of support to $Si_1Na_0TPA_{0.03}$.

When the product was analyzed by the powder X-ray diffraction method, it was found to have an amorphous texture containing absolutely no zeolite.

Example III-1

With distilled water, 0.26 g of sodium aluminate was dissolved till dilution to a total volume of 12 mL. In the aqueous solution, 8.25 g of silica beads (available from FUJI SILYSIA CHEMICAL LTD. in Japan, type "CARiACT Q-10", 10–20 mesh in particle size) dried in advance overnight at 120° C. were immersed for one hour. Then, the wet silica beads were dried over a hot water bath at 80° C. to support the sodium aluminate on the silica beads. The silica beads and the support were dried further overnight at 120° C. With distilled water, 8.91 g of an aqueous 40 wt. % tetrabutylammonium (hereinafter referred to briefly as "TBA") was diluted to a total volume of 12 mL. In this solution, the silica beads carrying sodium aluminate thereon were wholly immersed for one hour. Subsequently, they were dried over a hot water bath at 80° C. to support the sodium aluminate and the TBA on the silica beads. The atomic composition of support was $Si_1TBA_{0.100}Na_{0.026}Al_{0.020}$.

The precursor obtained was placed in a basket formed of a net of stainless steel. The basket containing the precursor was installed in the empty space of a closed vessel which is a jacketed crucible of polytetrafluoroethylene having an inner volume of 100 mL. The crucible, with 1g of distilled water placed in the bottom thereof, was heated at 170° C. for 30 hours. The crucible was cooled to room temperature. The product removed from the crucible was calcined in a current of air at 550° C. for six hours to expel the organic component originating in the TBA and afford 8.3 g of a white product. This product was labeled as "Product A3."

Figure 7:
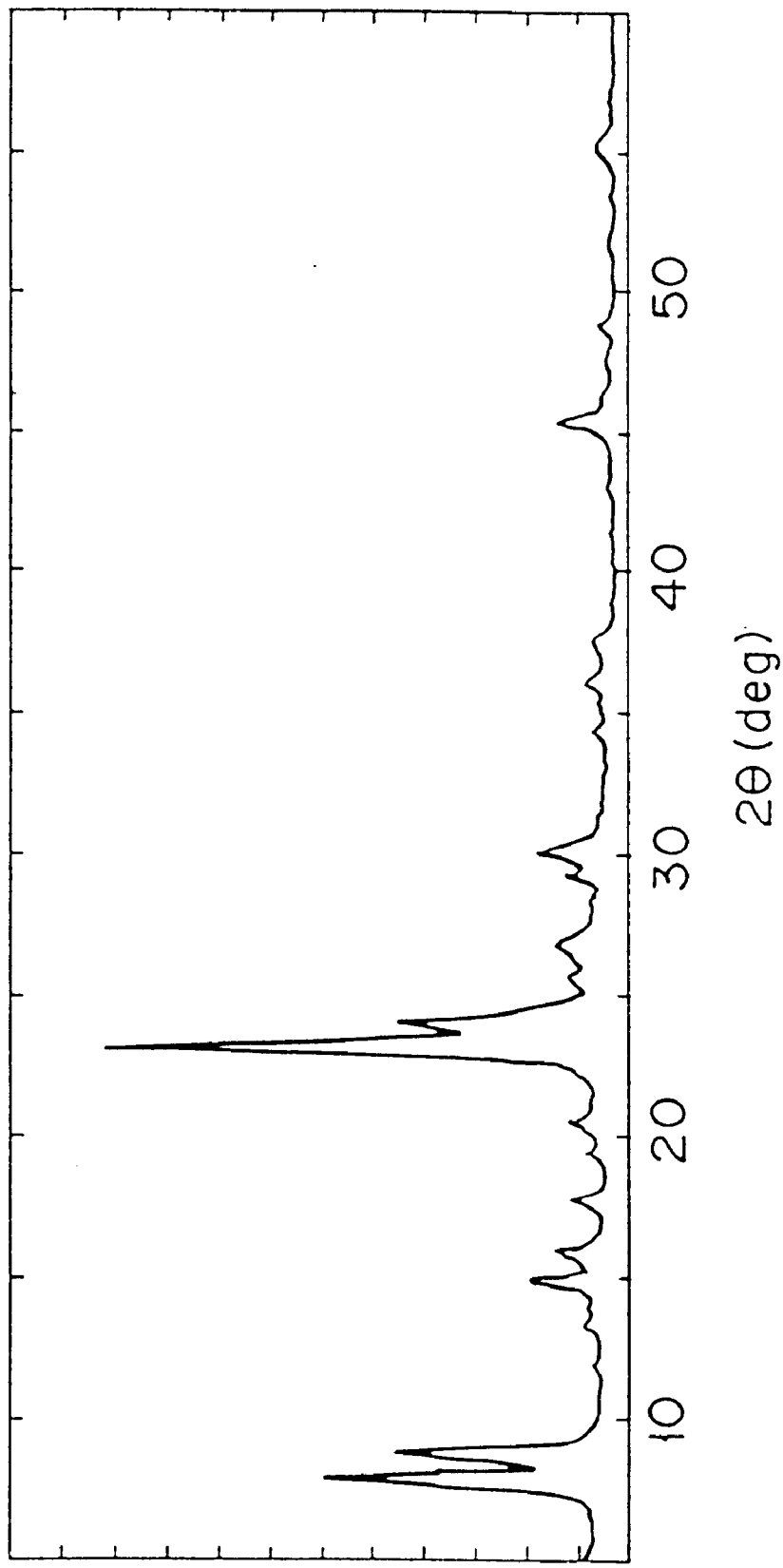
FIG. 7 represents a CuK α X-ray diffraction pattern (2 θ=5 to 60°) of a product A3.
Figure 8:
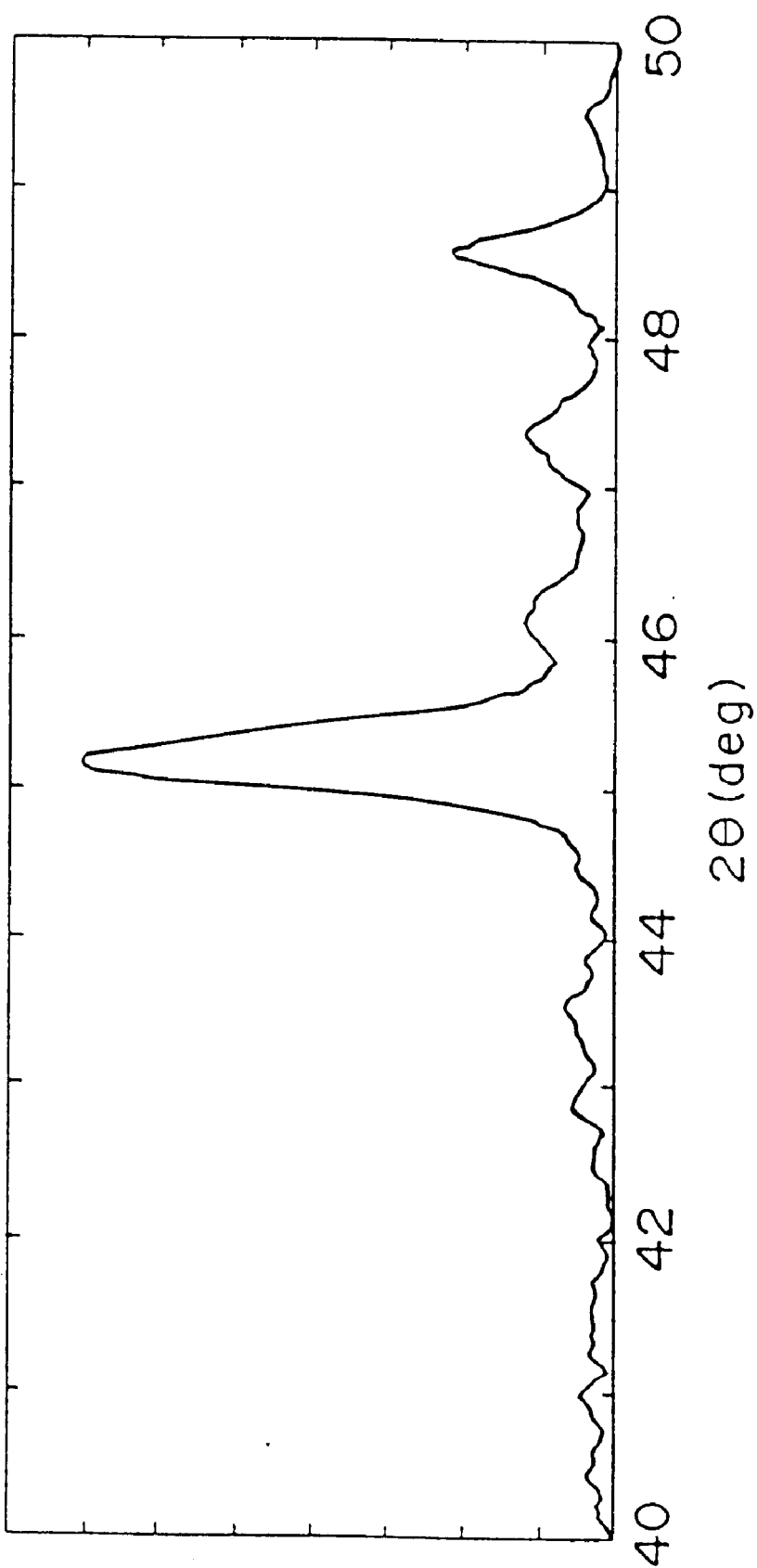
FIG. 8 represents a CuK α X-ray diffraction pattern (2 θ=40 to 50°) of the product A3.

Product A3 retained the appearance of the silica beads used as the raw material, and consisted of beads 10–20 mesh in particle size. Product A3 was pulverized and the resultant particles were analyzed by the powder X-ray diffraction method. The product was found to be a crystalline aluminosilicate of the MEL type as illustrated in FIGS. 7 and 8. Since the diffraction at 2 θ=44.86° illustrated in FIG. 8 was a singlet, Product A3 was found to be of the MEL type and not the MFI type. The zeolite content was nearly 100%.

An aluminosilicate powder of the MEL type was prepared in accordance with the conventional method (as disclosed in Example 8 of U.S. Pat. No. 3,709,979) as a standard substance for the determination of crystallinity. When the crystallinity of Product A3 was determined by using the aluminosilicate powder as a standard sample, it was found to be 98%.

Figure 9:
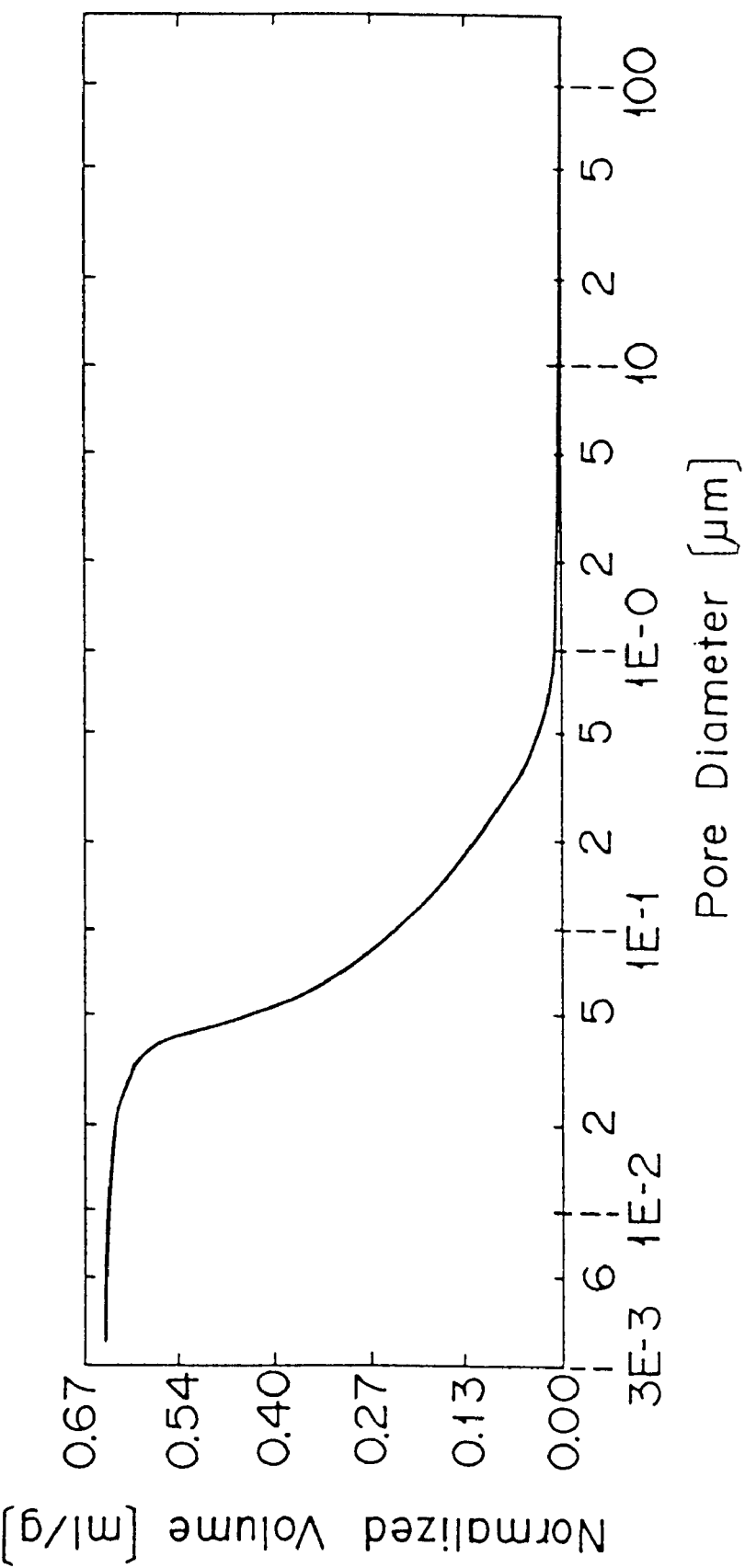
FIG. 9 represents a pore distribution curve of the product A3 by the mercury porosimetry method.

The specific surface area of Product A3 as determined by the BET 3-point method (P/PO=0.01, 003, 0.06) with nitrogen at 77K was found to be 476 $m^2/g$. When the pore distribution was determined by the mercury porosimetry method, the pore distribution curve illustrated in FIG. 9 was obtained, with the result that the volume of all the macropores not less than 4 nm in diameter was 0.64 mL/g, the surface area of the macropores was 40 $m^2/g$, and the volume of the pores having diameters in the range of 30–100 nm (average pore diameter of 50 nm) was 0.38 mL/g. Thus, Product A3 was found to have an exceptionally sharp pore distribution as evinced by the fact that the pores occupied about 60% of the volume of all the macropores not less than 4 nm in diameter.

Example III-2

With distilled water, 6.68 g of sodium aluminate was dissolved till dilution to a total volume of 140 mL. In the aqueous solution, 100 g of silica beads (available from FUJI SILYSIA CHEMICAL LTD. in Japan, type "CARiACT Q-10", 10–20 mesh in particle size) dried in advance overnight at 120° C. were immersed for two hours. Then, the wet silica beads were dried in a rotary evaporator in a current of nitrogen at 80° C. to support the sodium aluminate on the silica beads. The silica beads and the support were dried further overnight at 120° C. With distilled water, 107.97 g of an aqueous 40 wt. % TBA solution was diluted to a total volume of 140 mL. In this solution, the silica beads carrying sodium aluminate thereon were wholly immersed for one hour and dried similarly at 80° C. to support the sodium aluminate and the TBA on the silica beads. The atomic composition of support was $Si_1TBA_{0.100}Na_{0.053}Al_{0.042}$.

The precursor obtained was placed in a basket formed of a net of stainless steel. The basket containing the precursor was installed in the empty space of an autoclave of stainless steel having an inner volume of 3300 mL. The autoclave, with 30 g of distilled water placed in the bottom thereof, was heated at 170° C. for 32 hours. The autoclave was cooled to room temperature. The product removed from the autoclave was calcined in a current of air at 550° C. for six hours to expel the organic component originating in the TBA and afford 106 g of a white product. This product was labeled as "Product B3."

Product B3 retained the appearance of the silica beads used as the raw material, and consisted of beads 10–20mesh in particle size. Product B3 was pulverized and the resultant particles were analyzed by the powder X-ray diffraction method. The diffraction pattern obtained was substantially identical with that of Product A3. Thus, Product B3 was identified as a crystalline aluminosilicate of the MEL type. The zeolite content was nearly 100%.

An aluminosilicate powder of the MEL type was prepared in accordance with the conventional method (as disclosed in Example 8 of U.S. Pat. No. 3,709,979) as a standard substance for the determination of crystallinity. When the crystallinity of the Product B3 was determined by using the aluminosilicate powder as a standard sample, it was found to be 99%.

Figure 10:
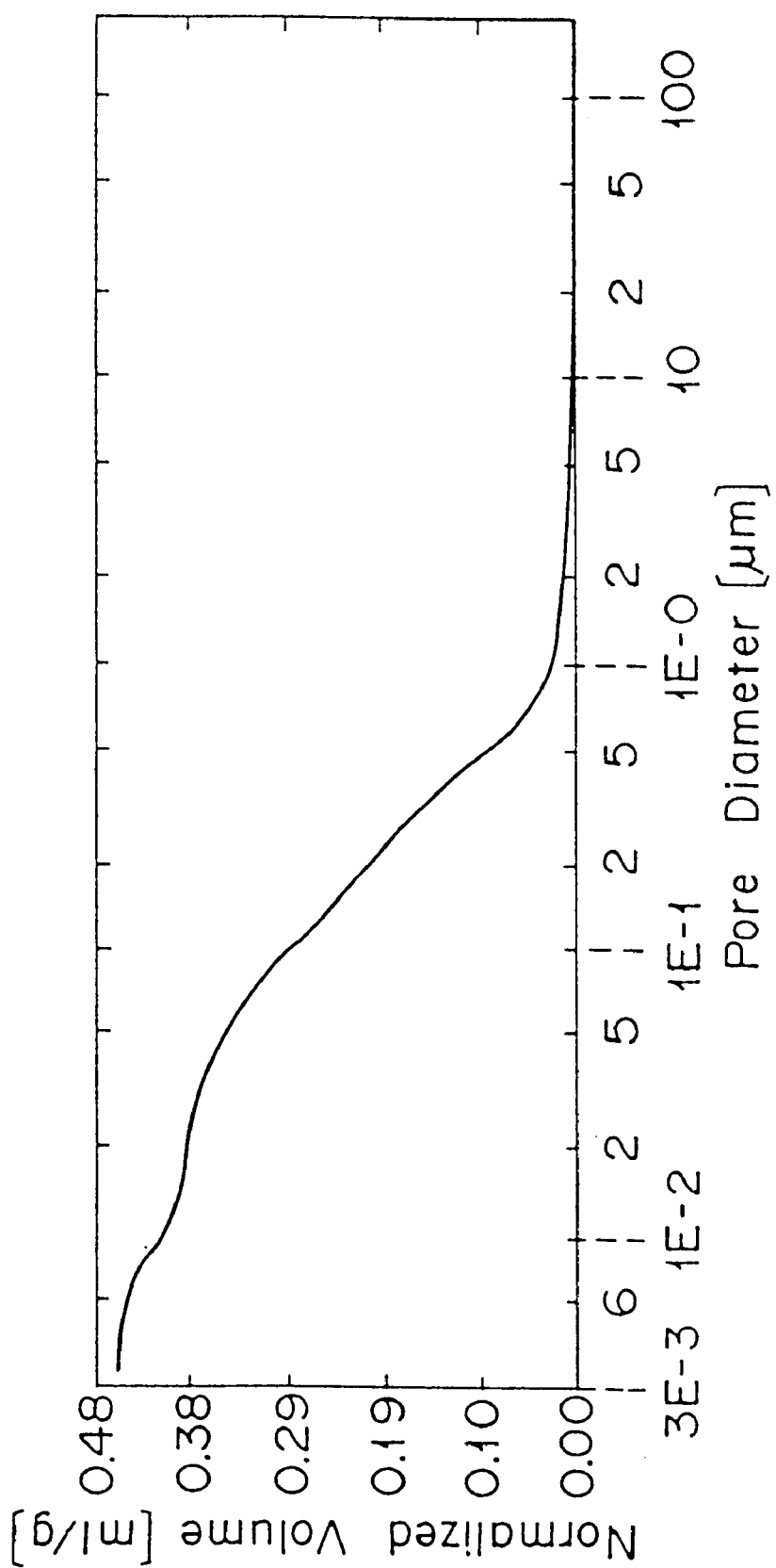
FIG. 10 represents a pore distribution curve of a product B3 by the mercury porosimetry method.

The specific surface area of Product B3 as determined by the BET 3-point method (P/PO=0.01, 003, 0.06) with nitrogen at 77K was found to be 376 $m^2/g$. When the pore distribution was determined by the mercury porosimetry method, the pore distribution curve illustrated in FIG. 10 was obtained, with the result that the volume of all the macropores not less than 4 nm in diameter was 0.45 mL/g and the surface area of the macropores was 44 $m^2/g$.

Example IV-1

In distilled water, 13.82 g of an aqueous 35 wt. % tetraethylammonium hydroxide (hereinafter referred to briefly as "TEA") solution and 0.32 g of sodium aluminate were dissolved till dilution to a total volume of 14 mL. In the whole aqueous solution mentioned above, 9.87 g of silica beads (available from FUJI SILYSIA CHEMICAL LTD. in Japan, type "CARiACT Q-10", 10–20 mesh in particle size) dried in advance overnight at 12° C. were immersed for one hour. The wet silica beads were then dried over a hot water bath at 80° C. to support the TEA and the sodium aluminate on the silica beads. The atomic composition of support was $Si_1TEA_{0.20}Na_{0.026}Al_{0.02}$.

The precursor obtained was placed in a basket formed of a net of stainless steel. The basket containing the precursor was installed in the empty space of a closed vessel which is a jacked crucible of polytetrafluoroethylene having an inner volume of 100 mL. The crucible, with 30 g of distilled water being placed in the bottom thereof, was heated at 170° C. for 144 hours. The crucible was cooled to room temperature. The product removed from the crucible was treated with 300 mL of an aqueous 1 mol/L ammonium nitrate solution and then calcined in a current of air at 550° C. for six hours to expel the organic component originating in the TEA and afford 9.72 g of a white product. This product was labeled as "Product A4."

Figure 11:
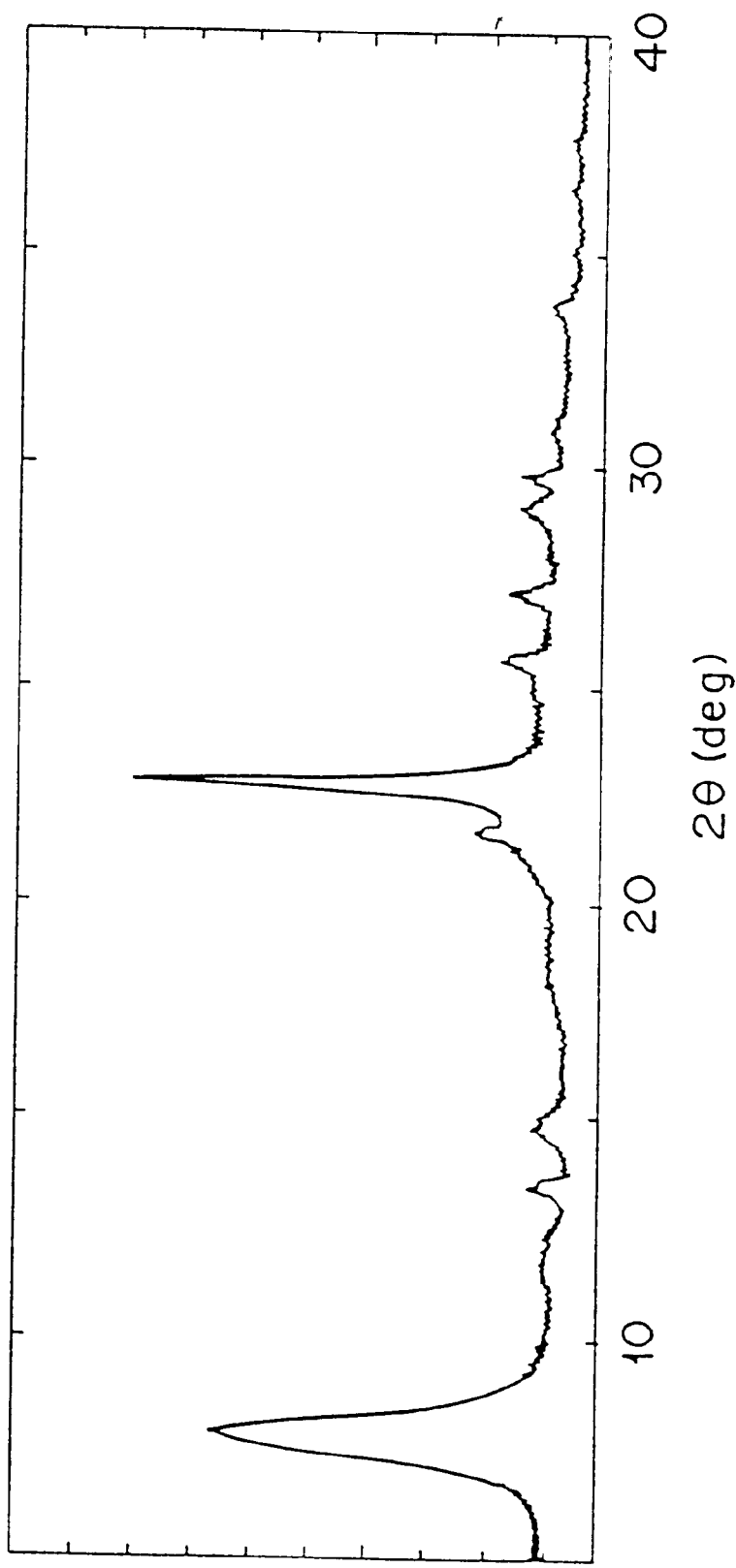
FIG. 11 represents a CuK α X-ray diffraction pattern (2 θ=5 to 60°) of a product A4.

Product A4 retained the appearance of the silica beads used as the raw material, and consisted of beads 10–20 mesh in particle size. Product A4 was pulverized and the resultant particles were analyzed by the powder X-ray diffraction method. The product was consequently identified as a crystalline aluminosilcate of the BEA type as illustrated in FIG. 11. The zeolite content was nearly 100%.

When the crystallinity of Product A4 was determined by using "JRC-HB25 (1)" as a standard sample, it was found to be 98.5%.

Figure 12:
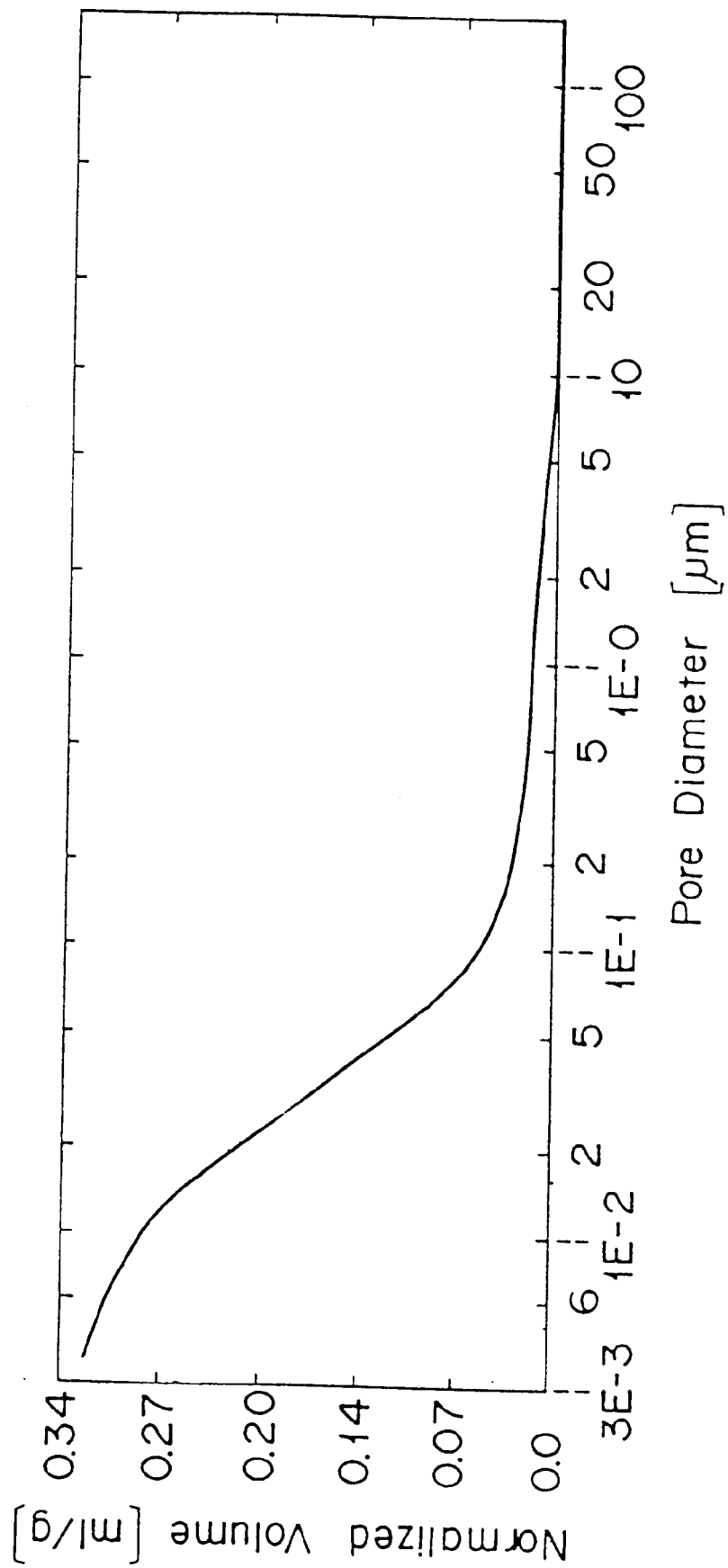
FIG. 12 represents a pore distribution curve of the product A4 by the mercury porosimetry method.

The specific surface area of Product A4 as determined by the BET 3-point method (P/PO=0.01, 003, 0.06) with nitrogen at 77K was found to be 693 $m^2/g$. When the pore distribution was determined by the mercury porosimetry method, the pore distribution curve illustrated in FIG. 12 was obtained, with the result that the volume of all the macropores not less than 4 nm in diameter was 0.33 mL/g, the surface area of the macropores was 65 $m^2/g$, and the volume of pores having diameters in the range of 10–80 nm (average pore diameter 30 nm) was 0.22 mL/g. The product A4, thus, was found to have an exceptionally sharp pore distribution as evinced by the fact that the pores occupied about 68% of the volume of all the macropores not less than 4 nm in diameter.

Example IV-2

In distilled water, 14.01 g of an aqueous 35 % by weight of tetraethylammonium hydroxide (hereinafter referred to briefly as "TEA") solution and 0.53 g of sodium aluminate were dissolved. In the whole aqueous solution mentioned above, 10.0 g of silica beads (available from FUJI SILYSIA CHEMICAL LTD. in Japan, type "CARiACT Q-30", 10–20 mesh in particle size) dried in advance overnight at 120° C. were immersed for one hour. The wet silica beads were then dried over a hot water bath at 80° C. to support the TEA and the sodium aluminate on the silica beads. The atomic composition of support was $Si_1TEA_{0.20}Na_{0.043}Al_{0.033}$.

The precursor obtained was crystallized at 170° C. for 20 hours in the same manner as in Example IV-1. The product was cooled and calcined in the current of air at 550° C. for six hours to expel the organic component originating in the TEA and obtain 10.5 g of a white product. This product was labeled as "Product B4."

Product B4 retained the appearance of the silica beads used as the raw material, and consisted of beads 10–20 mesh in particle size. Product B4 was pulverized and the resultant particles were analyzed by the powder X-ray diffraction method. The diffraction pattern obtained was substantially equal to that. The product was consequently identified as a crystalline aluminosilcate of the BEA type as illustrated in FIG. 11.

Figure 13:
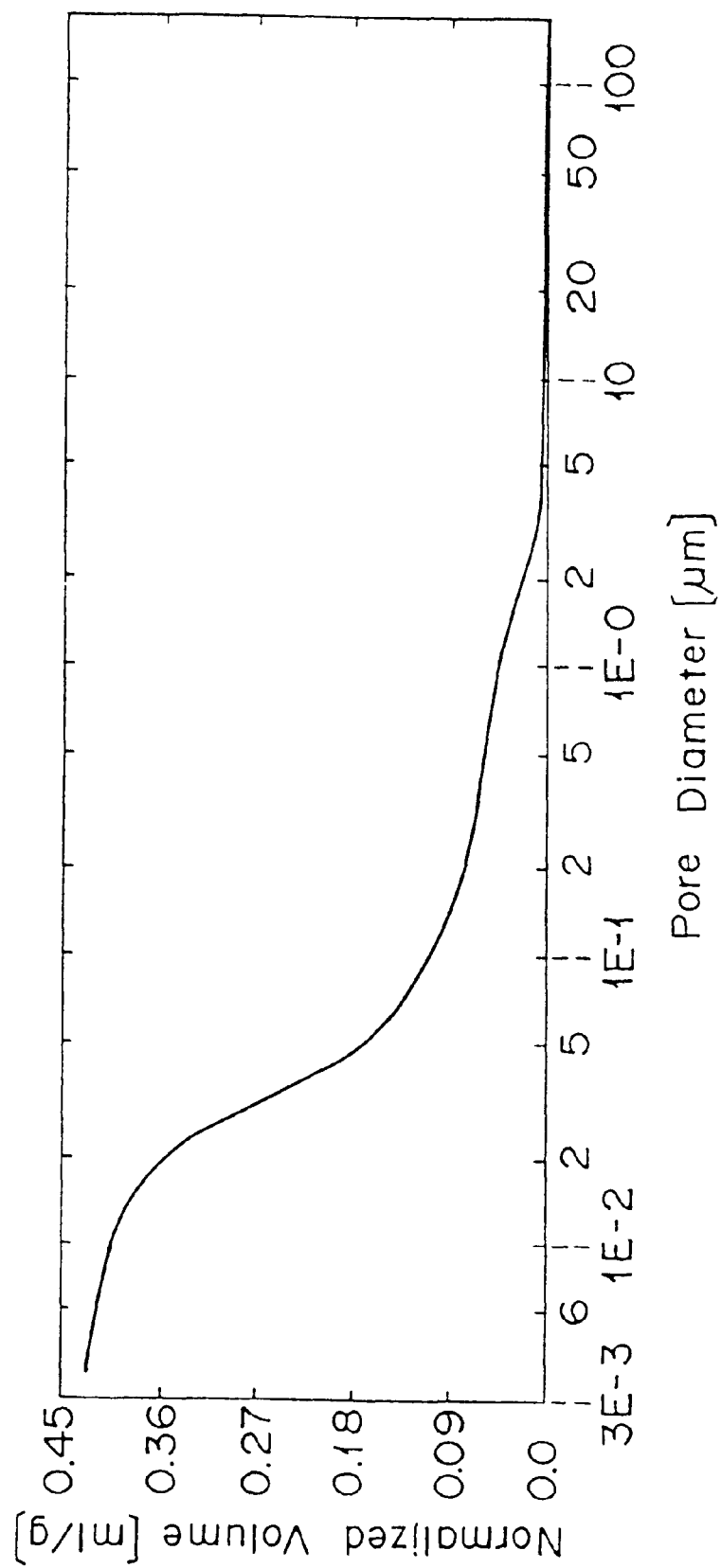
FIG. 13 represents a pore distribution curve of the product B4 by the mercury porosimetry method.

The specific surface area of Product B4 as determined by the BET 3-point method (P/PO=0.01, 003, 0.06) with nitrogen at 77K was found to be 630 $m^2/g$. When the pore distribution was determined by the mercury porosimetry method, the pore distribution curve illustrated in FIG. 13 was obtained, with the result that the volume of all the macropores not less than 4 nm in diameter was 0.43 mL/g, the surface area of the macropores was 59 $m^2/g$, and the volume of pores having diameters in the range of 10–80 nm (average pore diameter 30 nm) was 0.28 mL/g. The product B4, thus, was found to have an exceptionally sharp pore distribution as evinced by the fact that the pores occupied about 66% of the volume of all the macropores not less than 4 nm in diameter.

The following examples represent cases of producing an ethanolamine mainly from ethylene oxide and ammonia. These examples are intended for the purpose of explaining this invention and are not meant to limit the invention.

The LHSV, the conversion of ethylene oxide, and the selectivity of diethanolamine were defined below. Incidentally, virtually no product was formed other than ethanolamines. The conversion of ethylene oxide (mol %) was nearly equal to the overall yield (mol %) of (mono, di, tri) ethanolamines on the basis of ethylene oxide.

$$LHSV\ (hr^{-1}) = (AB)/(AC)$$

wherein AB denotes the volume of the liquid raw material passing the reactor per hour ($cm^3/hr$), and AC the volume of the catalyst in the reactor ($cm^3$)

$$Conversion\ (mol\ \%)\ of\ ethylene\ oxide = 100\ (BC)/(BD)$$

wherein BC denotes the number of mols of ethylene oxide consumed in the reaction and BD the number of mols of ethylene oxide supplied to the reaction.

$$Selectivity\ (wt.\ \%)\ of\ diethanolamine = 100\ (CD)/(CE)$$

wherein CD denotes the weight of diethanolamine in the product and CE the weight of all the ethanolamines in the product.

Example V-1

8.08 g of aluminum nitrate nonahydrate was dissolved in distilled water till dilution to a total volume of 38 mL. In the aqueous solution, 31.04 g of silica beads (available from FUJI SILYSIA CHEMICAL LTD. in Japan, type "CARiACT Q-6", 16 to 32 mesh in particle size) dried in advance overnight at 120° C. were immersed at room temperature for one hour. Subsequently, the wet silica beads were dried over a hot water bath at 100° C. and the dried silica beads were calcined in a current of air at 550° C. for three hours. Consequently, aluminum oxide was supported on the silica beads. Thereafter, the silica beads carrying the support were cooled. A mixture was formed between 7.6 mL of an aqueous 4 mols/L sodium hydroxide solution and 22.84 g of an aqueous 23 wt. % TPAOH solution. The resultant mixture was diluted with distilled water to a total volume of 38 mL. The silica beads carrying the support were immersed in the diluted solution for one hour and were then dried over a hot water bath at 100° C. They were further dried in an oven at 80° C. under a current of nitrogen for five hours. The atomic composition of support was $Si_1Al_{0.042}Na_{0.059}TPA_{0.05}$.

The precursor obtained was placed in a cup of polytetrafluoroethylene. The cup containing the precursor was installed in the open space of an autoclave made of stainless steel having an inner volume of 3300 mL. The autoclave containing the precursor, with 30 g of distilled water placed in the bottom thereof, was heated at 180° C. for 20 hours till crystallization of the precursor. The autoclave was cooled to room temperature and the product was removed from the autoclave. A jacketed column was packed with the product. An aqueous 1 mol/L ammonium nitrate solution was passed through the column at 60° C. a flow rate of 0.4 mL/min for 24 hours to effect ion exchange. The ion-exchanged product was washed with 500 mL of distilled water and dried at 120° C. for five hours. It was then calcined under a current of air at 550° C. for six hours to expel the excess organic component and obtain 29 g of a white product. This product was labeled as "Product A5."

Product A5 retained the appearance of the silica beads used as the raw material, and consisted of beads 16–32 mesh in particle size. Product A5 was pulverized and the resultant particles were analyzed by the powder X-ray diffraction method. The diffraction pattern obtained was substantially equal to that illustrated in FIG. 1. Thus, the product A5 was identified as a zeolite of the ZSM-5 type.

The specific surface area of Product A5 as determined by the BET 3-point method (P/PO=0.01, 003, 0.06) with nitrogen at 77K was found to be 360 $m^2/g$. When the pore distribution was determined by the mercury porosimetry method, the volume of all the macropores not less than 4 nm was found to be 0.6 mL/g.

Example V-2

An experiment was carried out by following the procedure of Example V-1 while using 33.5 g of an aqueous 40 wt. % of TBAOH solution instead of 22.84 g of the aqueous 23 wt. % TPAOH solution and changing the conditions of crystallization to 170° C. for 32 hours. The atomic composition of the precursor obtained was $Si_1Al_{0.042}Na_{0.063}TBA_{0.10}$. This product was labeled as "Product B5."

Product B5 retained the appearance of the silica beads used as the raw material, and consisted of beads 16–32 mesh in particle size. Product B5 was pulverized and the resultant particles were analyzed by the powder X-ray diffraction method. The diffraction pattern obtained was substantially equal to that illustrated in FIGS. 7 and 8. Thus, the product B5 was identified as a zeolite of the MEL type.

The specific surface area of Product B5 as determined by the BET 3-point method (P/PO=0.01, 003, 0.06) with nitrogen at 77K was found to be 410 $m^2/g$. When the pore distribution was determined by the mercury porosimetry method, the volume of all the macropores not less than 4 nm was found to be 0.6 mL/g.

Example V-1 of Catalyst Preparation

With distilled water, 0.8383 g of lanthanum nitrate hexahydrate was dissolved till dilution to a total volume of 38 mL. In the resultant aqueous solution, 29 g of the zeolite beads of the MFI type (proton type, 16–32 mesh in particle size) prepared in Example V-1 were immersed at room temperature for one hour. Subsequently, the wet beads were dried over a hot water bath at 100° C. The dried beads were calcined under a current of air at 550° C. for three hours to obtain lanthanum-containing zeolite beads of the MFI type. The beads were labeled as "Catalyst A5."

Example V-2 of Catalyst Preparation

A catalyst of lanthanum-containing zeolite beads of the MEL type was obtained by following the procedure of Example V-1 of Catalyst Preparation while using the zeolite beads (proton type, 16–32 mesh in particle diameter) of the MEL type prepared in Example V-2 instead of the zeolite beads of the MFI type. It was labeled as "Catalyst B5."

Example V-3 (Comparative Example) of Catalyst Preparation

In a solution obtained in advance by dissolving 2.50 g of lanthanum nitrate hexahydrate in 250 mL of distilled water, 100 g of a commercially available zeolite of ZSM-5 type (available from ZEOLYST International, Si/Al atomic ratio= 28, proton type) was immersed for one hour. Subsequently, the wet zeolite was dried over a hot water bath at 100° C. The dried zeolite was calcined under a current of air at 550° C. for three hours to obtain a lanthanum-containing zeolite ZSM-5.

A slurry was obtained by mixing and kneading 70 g of the lanthanum-containing zeolite ZSM-5 obtained as described above with 145 g of alumina sol (available from Nissan Kagaku K.K. in Japan, type "Alumina Sol 520", alumina content 20.7 wt. %) (30 g as alumina) and then concentrated till a water content of 40 wt. %. The resultant concentrated material was extrusion molded into pellets 0.7 mm in diameter. By calcining the molding in a current of air at 650° C. for three hours, a lanthanum-containing catalyst of ZSM-5 type with an alumina binder was obtained. This catalyst was labeled as "Catalyst CC5."

Example V-3

A reaction for synthesizing ethanolamines from ethylene oxide and ammonia was performed in the presence of the catalyst A5 prepared in Example V-1 of Catalyst Preparation.

Figure 14:
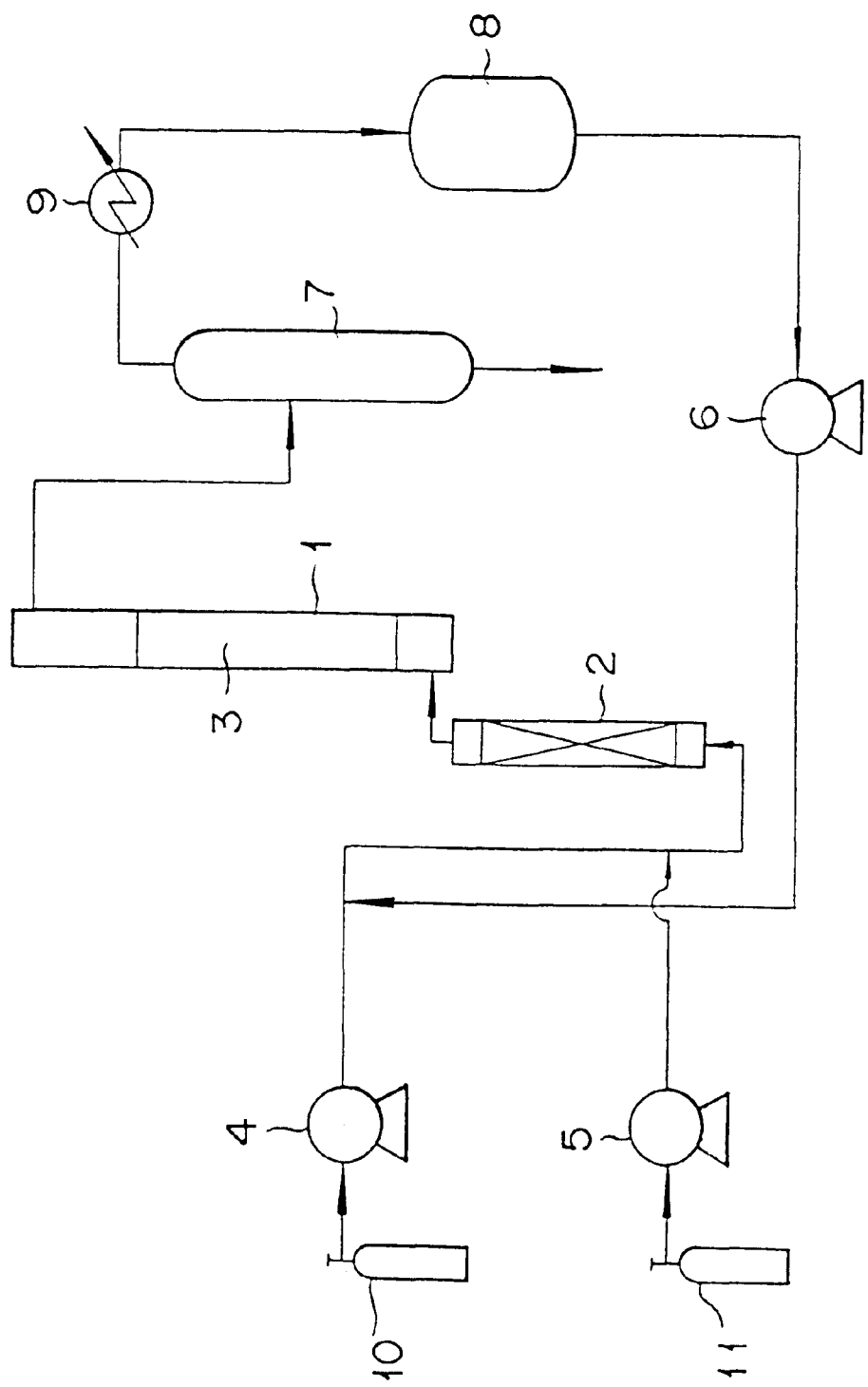
FIG. 14 is a diagram for explaining a reaction apparatus used in the examples.

FIG. 14 illustrates a reaction apparatus used for the reaction. With reference to FIG. 14, a reaction tube 1,10 mm in inside diameter and 400 mm in length, made of stainless steel and insulated as wrapped in a heater serving to compensate for the heat lost by radiation was used. For the purpose of measuring the temperature profile of the catalyst bed, the reaction tube was provided in the interior thereof with a protecting tube fit for insertion of a thermocouple. This reaction tube was filled with 20 mL of the catalyst A5.

To a preheater 2, ethylene oxide was supplied from a raw material tank 10 for ethylene oxide via a high pressure pump 4 and ammonia from a raw material tank 11 for ammonia via a high pressure pump 5. The raw materials (ammonia/ethylene oxide=15 (molar ratio)) heated in the preheater 2 to 70° C. were fed at a LHSV of 10 hr$^{-1}$ to a reaction vessel 3. Into the reaction vessel, ammonia and ethylene oxide were delivered at prescribed rates by the high pressure pumps, with the reaction pressure maintained at 14 Mpa. The temperature at the inlet to the reaction vessel was 70° C. The reaction solution was collected in an ammonia flush column 7 and analyzed by gas chromatography. The unaltered raw material gases, mainly ammonia, were cooled through the medium of a heat exchanger 9 and recovered in a recovered ammonia tank 8. The ammonia gas collecting in the recovered ammonia tank 8 was extracted via a high pressure pump 6 and reclaimed as the raw material ammonia.

The defiling substances such as ethanolamines were analyzed by gas chromatography with a measuring instrument (fused silica capillary column (30 m, 0.53 mm, 0.5 μm in film thickness)). The ethanolamines and other defiling substances were quantitatively analyzed based on the area ratio determined by a FID detector (by diluting the reaction solution at the end of the ammonia flush to 0.25 wt. % and injecting the diluted reaction solution in a volume of 10 μL).

The results of the reaction after the elapse of 24 hours following the start are shown in Table 1 below.

Example V-4

A reaction was performed by following the procedure of Example V-3 while using Catalyst B5 instead of Catalyst A5.

The results of the reaction after the elapse of 24 hours following the start are shown in Table 1 below.

Comparative Example V-1

A reaction was performed by following the procedure of Example V-3 while using Catalyst CC5 instead of Catalyst A5. Defiling substances such as DGA, DEA+EO, and TEA+EO were detected.

The results are shown in Table 1.

TABLE 1

|  | Catalyst A5 | Catalyst B5 | Catalyst CC5 |
|---|---|---|---|
| Conversion of ethyleneoxide | 100% | 100% | 100% |
| Weight proportion of monoethanolamine | 65.3% | 63.7% | 67.8% |
| Weight proportion of diethanolamine | 34.5% | 35.6% | 27.1% |
| Weight proportion of triethanolamine | 0.2% | 0.7% | 2.0% |
| Selectivity of diethanolamine | 34.5% | 35.6% | 28.0% |
| Weight proportion of DGA | nd | nd | 1.0% |
| Weight proportion of DEA + EO | nd | nd | 1.8% |
| Weight proportion of TEA + EO | nd | nd | 0.3% | nd: not detected.
DGA: Diglycolamine
DEA + EO: Adduct of 1 mol of ethylene oxide to the terminal hydroxyl group of diethanolamine
TEA + EO: Adduct of 1 mol of ethylene oxide to the terminal hydroxyl group of triethanolamine The entire disclosure of Japanese Patent Application Nos. 11-172760, 11-174852, 11-291887 and 11-320728 filed on Jun. 18, 1999, Jun. 22, 1999, Oct. 14, 1999 and Nov. 11, 1999, respectively, including specification, claims, drawings and summary are incorporated herein by reference in its entirely.

What is claimed is:

1. A method for the production of a molding of binderless zeolite, which comprises:

supporting on a molding of silica a raw material substance comprising a tetraalkylammonium component containing 1–5 carbon atoms in the alkyl group thereof, an alkali metal component, and, optionally a metal component to be incorporated into the crystal skeleton of zeolite to form a zeolite precursor represented by the formula (1):

$$Si(SDA)_xM_yQ_z \quad (1)$$

wherein SDA denotes a tetraalkylammonium, M an alkali metal, Q a metal (excluding silicon) to be incorporated into the crystal skeleton of zeolite, x a numeral in the range of 0.001–1, y a numeral in the range of 0.0001–1, and z a numeral in the range of 0–0.5;

drying the precursor; and exposing the dried precursor to saturated steam.

2. A method according to claim 1, wherein the tetraalkylammonium is at least one member selected from the group consisting of tetra-n-propylammonium, tetrabutylammonium, and tetraethylammonium.

3. A method according to claim 1, wherein the alkali metal is at least one member selected from the group consisting of lithium, sodium and potassium.

4. A method according to claim 1, wherein the metal to be incorporated into the crystal skeleton is aluminum.

5. A method according to claim 1, wherein the metal to be incorporated into the crystal skeleton is at least one member selected from the group consisting of iron, boron, zinc, chromium, cobalt, nickel, titanium, copper, indium, and gallium.

6. A method according to claim 5, wherein the metal is at least one member selected from the group consisting of iron, boron, zinc, and gallium.

7. A method according to claim 1, wherein a temperature of the saturated steam is in the range of 80 to 260° C.

8. A method according to claim 7, wherein the temperature is in the range of 100 to 230° C.

9. A method according to claim 1, wherein the tetraalkylammonium component is a tetra-n-propylammonium salt and the molding of binderless zeolite is a molding of binderless zeolite of the MFI type.

10. A method according to claim 1, wherein the tetraalkylammonium component is a tetra-n-propylammonium salt and the molding of binderless zeolite is a molding of binderless zeolite of the MEL type.

11. A method according to claim 1, wherein the tetraalkylammonium component is a tetra-n-propylammonium salt and the molding of binderless zeolite is a molding of binderless zeolite of the BEA type.

* * * * *